United States Patent
Mercuri et al.

(10) Patent No.: US 12,447,022 B2
(45) Date of Patent: Oct. 21, 2025

(54) ANNULUS REPAIR DEVICES, SYSTEMS, AND METHODS

(71) Applicant: Clemson University Research Foundation, Clemson, SC (US)

(72) Inventors: Jeremy J. Mercuri, Piedmont, SC (US); Richard diMonda, Marietta, GA (US); Matt Pursley, Dawsonville, GA (US); Ishmael Bentley, Edina, MN (US)

(73) Assignee: CLEMSON UNIVERSITY RESEARCH FOUNDATION, Clemson, SC (US)

( * ) Notice: Subject to any disclaimer, the term of this patent is extended or adjusted under 35 U.S.C. 154(b) by 0 days.

(21) Appl. No.: 17/962,046

(22) Filed: Oct. 7, 2022

(65) Prior Publication Data

US 2023/0114987 A1 Apr. 13, 2023

Related U.S. Application Data

(60) Provisional application No. 63/253,419, filed on Oct. 7, 2021.

(51) Int. Cl.
*A61F 2/44* (2006.01)
*A61B 17/04* (2006.01)

(52) U.S. Cl.
CPC .......... *A61F 2/442* (2013.01); *A61B 17/0401* (2013.01); *A61B 2017/0409* (2013.01);
(Continued)

(58) Field of Classification Search
CPC ... A61B 17/86; A61B 17/8685; A61B 17/864; A61B 17/8625
See application file for complete search history.

(56) References Cited

U.S. PATENT DOCUMENTS 5,718,012 A 2/1998 Cavallaro
6,306,159 B1 * 10/2001 Schwartz ........... A61B 17/0401
606/232
(Continued)

FOREIGN PATENT DOCUMENTS

WO 2011044484 A1 4/2011
WO 2017044573 A1 3/2017

OTHER PUBLICATIONS

Borem, "Multi-laminate Annulus Fibrosus Repair Scaffold with an Interlamellar Matrix Enhances Impact Resistance, Prevents Herniation and Assists in Restoring Spinal Kinematics", J Mech Behav Biomed Mater, Jul. 2019, 95: 41-52.

*Primary Examiner* — Eduardo C Robert
*Assistant Examiner* — Holly Joanna Lane
(74) *Attorney, Agent, or Firm* — Fredrikson & Byron, P.A.

(57) ABSTRACT

Integratable treatment devices, assemblies including a treatment device, at least one anchor, and a tether coupled thereto, and various methods and devices for inserting such devices and assemblies are disclosed herein. The treatment devices can be made of an integratable material that is not fully bioresorbable but promotes native tissue growth in and around the material. Certain methods involve first inserting at least one anchor and then advancing a treatment device via a tether coupled to the at least one anchor. Further various insertion devices that can be used to implant any of the treatment devices herein using any of the methods herein are disclosed.

20 Claims, 22 Drawing Sheets

(52) U.S. Cl.
CPC ............... *A61B 2017/0464* (2013.01); *A61F 2002/4435* (2013.01); *A61F 2310/00371* (2013.01)

(56) References Cited

U.S. PATENT DOCUMENTS

| | | | | |
|---|---|---|---|---|
| 6,565,960 | B2* | 5/2003 | Koob | D06M 13/152 |
| | | | | 428/317.9 |
| 7,993,405 | B2* | 8/2011 | Cauthen, III | A61F 2/441 |
| | | | | 606/86 R |
| 8,535,338 | B2* | 9/2013 | Wales | A61F 2/442 |
| | | | | 606/139 |
| 8,758,351 | B2* | 6/2014 | Evans | A61F 2/4611 |
| | | | | 606/86 R |
| 9,700,291 | B2* | 7/2017 | Norton | A61B 17/0218 |
| 10,206,673 | B2* | 2/2019 | Maisano | A61B 17/0487 |
| 10,932,769 | B2* | 3/2021 | Viola | A61B 17/06109 |
| 2005/0283246 | A1* | 12/2005 | Cauthen | A61B 17/0401 |
| | | | | 623/908 |
| 2010/0057143 | A1* | 3/2010 | Lambrecht | A61B 5/1076 |
| | | | | 606/86 R |
| 2014/0155644 | A1* | 6/2014 | Popp | C07F 7/21 |
| | | | | 556/460 |
| 2018/0228938 | A1 | 8/2018 | McGuire et al. | |

* cited by examiner

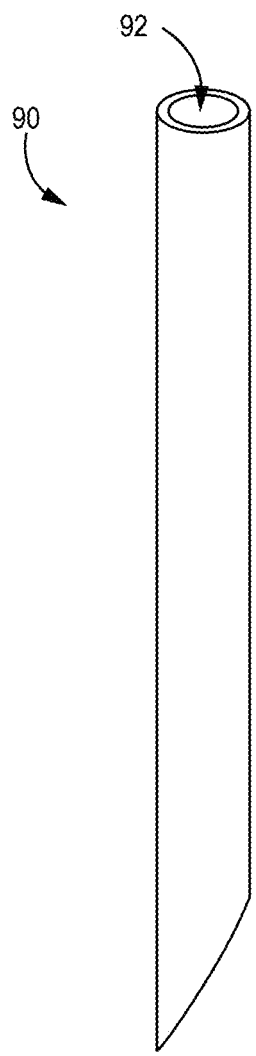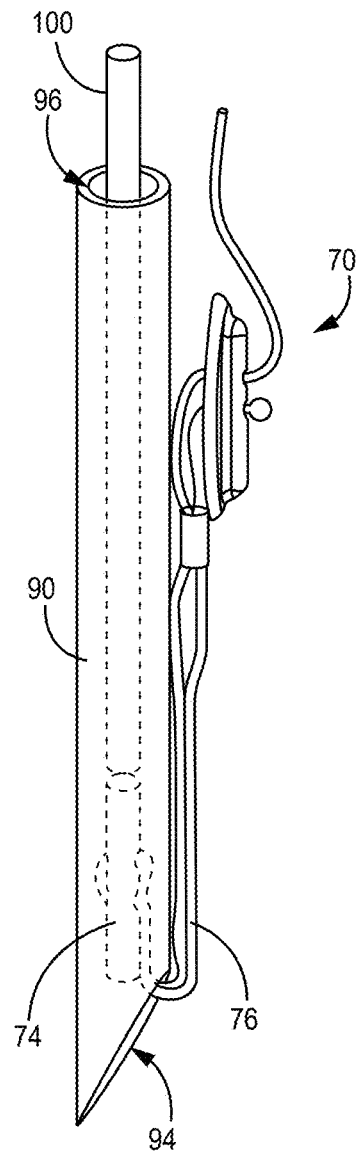
FIG. 9  FIG. 10A

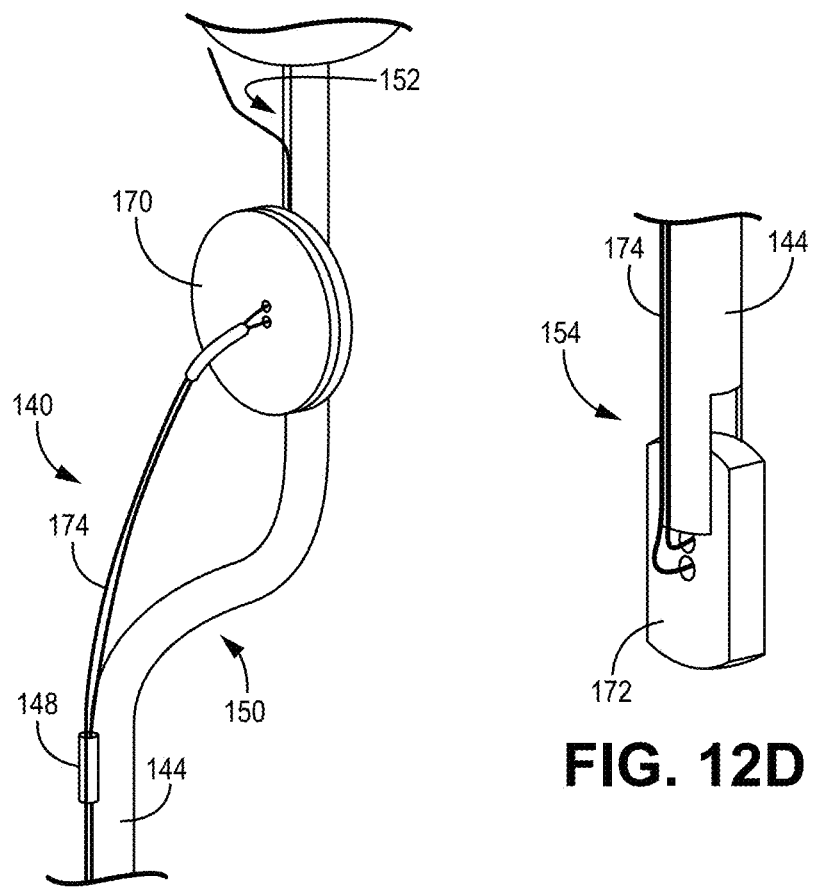

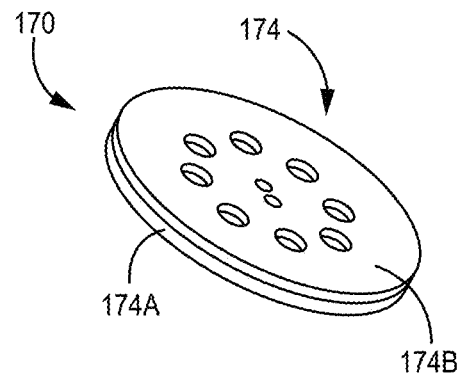
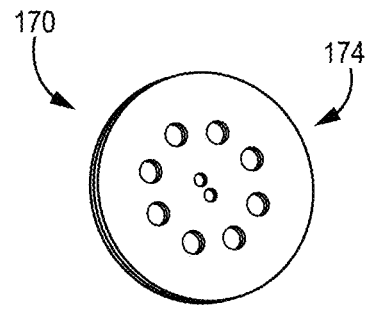
FIG. 13A  FIG. 13B
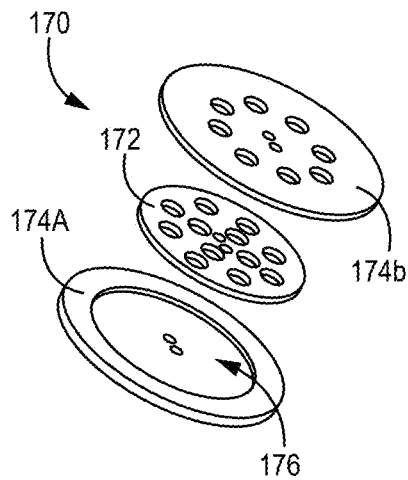
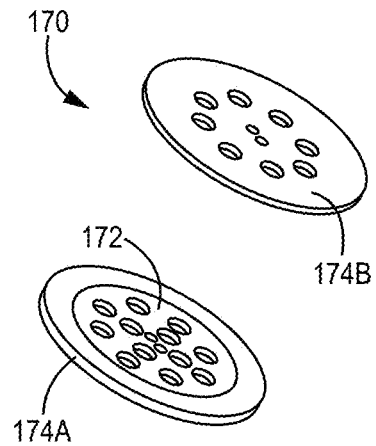
FIG. 13C  FIG. 13D

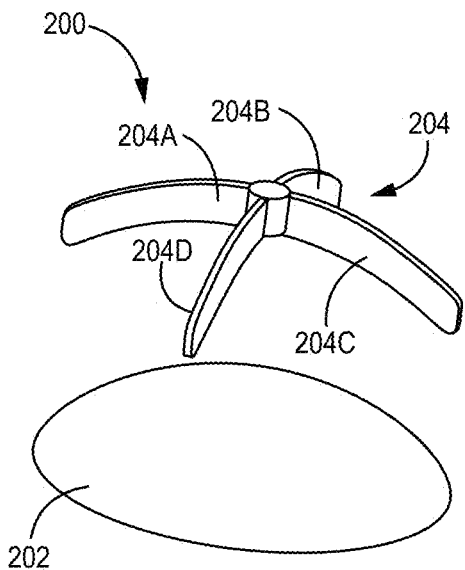
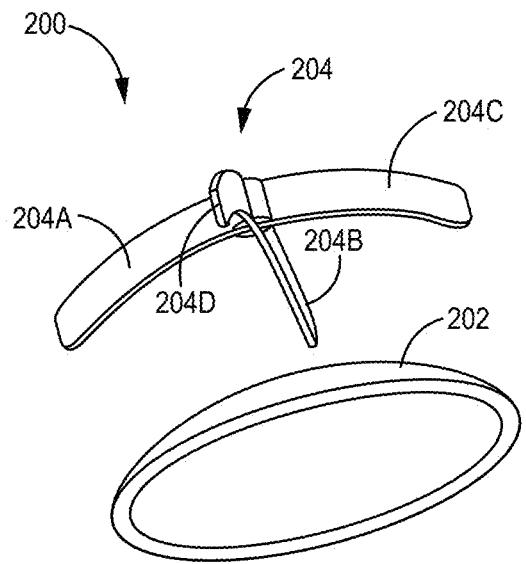
FIG. 14A  FIG. 14B
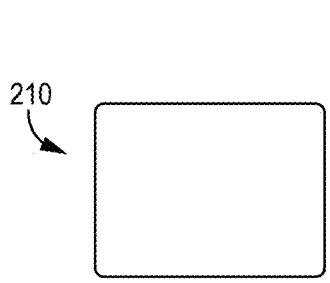
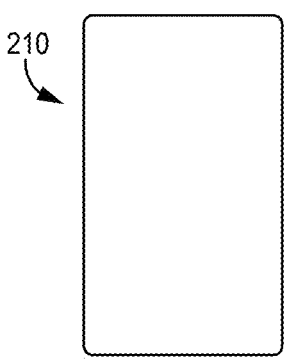
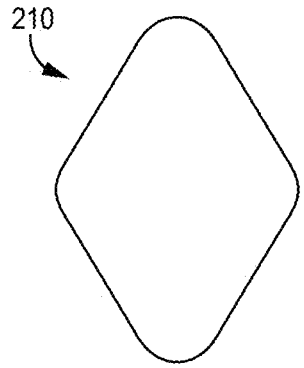
FIG. 15A  FIG. 15B  FIG. 15C

ANNULUS REPAIR DEVICES, SYSTEMS, AND METHODS

CROSS-REFERENCE TO RELATED APPLICATION(S)

This application claims the benefit under 35 U.S.C. § 119(e) to U.S. Provisional Application 63/253,419, filed Oct. 7, 2021 and entitled "Delivery and Attachment Systems for Annulus Fibrosus Repair Patch," which is hereby incorporated herein by reference in its entirety.

GOVERNMENT SUPPORT

This invention was made with government support under Grant No. 190200032, awarded by the Department of Commerce. The government has certain rights in the invention.

FIELD

The various embodiments herein relate to spinal disc defect repair methods and devices.

BACKGROUND

Spinal discs often have defects such as herniations or ruptures that require surgery to repair. Nearly 400,000 discectomies are performed each year in the US to remove herniated disc tissue fragments. Frequently, these surgeries leave an opening (or "defect") in the outer shell of the disc (referred to as the "annulus") that requires additional medical intervention at some point.

There are multiple known methods for repairing a spinal disc defect involving a tether and anchor mechanism that are used to secure a mechanical device (typically a plug or patch or the like) to the defect. These methods involve placement of the device either in or over the defect, and then securing the patch/plug in place using some type of anchor.

These known repair methods and devices have several disadvantages, including many resulting from the limited access to the repair site through an anatomically-restricted access path. One disadvantage is the complexity of the known delivery systems for inserting and positioning the therapeutic devices in confined locations and the expandable devices themselves. Another disadvantage is that the tethers are often required to be placed in compromised tissue as a result of the access limitations. A further disadvantage relates to the need to maintain the position of the therapeutic device while tethering that device. In addition, another disadvantage is that the known methods require that the therapeutic device and/or tethers be positioned without visualization as a result of the limited access path. Similarly, the placement of the therapeutic device at the target location using the known methods can subsequently obscure visualization for and/or otherwise hinder optimum tether placement. Finally, another disadvantage is the potential for adjacent structure and/or nerve injury during tether placement.

Only one FDA-approved device is currently on the market for addressing the problem of reherniation. One disadvantage of the device is that it has detrimental impacts on the disc and adjacent vertebrae. Further, the device is made of metal and polymer and thus does not promote natural healing of the disc.

There is a need in the art for an improved method for spinal disc defect repair and related devices and systems.

BRIEF SUMMARY

Discussed herein are various devices, methods, and systems for treating damaged intervertebral discs, including integratable treatment devices (or patches), treatment assemblies containing such treatment devices, and/or methods of implanting various types of treatment devices.

In Example 1, an assembly for repairing an annulus fibrosus comprises a integratable treatment device comprising a material configured to integrate into a native tissue, at least a first anchor, and a tether operably coupled to the first anchor and operably coupled to the treatment device such that a length of the tether is disposed between the first anchor and the treatment device.

Example 2 relates to the assembly according to Example 1, wherein the material comprises a cross-linked collagen material.

Example 3 relates to the assembly according to Example 1, wherein the material comprises porcine pericardium tissue.

Example 4 relates to the assembly according to Example 1, wherein the integratable treatment device comprises a treatment body, wherein the treatment body comprises the material configured integrate into the native tissue, and a support body associated with the treatment body.

Example 5 relates to the assembly according to Example 4, wherein the support body is attached to a first side of the treatment body.

Example 6 relates to the assembly according to Example 4, wherein the support body is disposed within the treatment body.

Example 7 relates to the assembly according to Example 1, further comprising a second anchor operably coupled to the tether, wherein the second anchor is disposed on a side of the treatment device opposite the first anchor.

In Example 8, a method of repairing a herniated annulus comprises inserting a first anchor into a target tissue such that the first anchor is disposed within the target tissue, wherein the first anchor is operably coupled to a first tether, urging a treatment device distally toward a defect in the annulus via the first tether, and securing the treatment device to the defect with the first tether.

Example 9 relates to the assembly according to Example 8, wherein the target tissue comprises at least one of the annulus, a first adjacent vertebral body, and a second adjacent vertebral body.

Example 10 relates to the assembly according to Example 8, further comprising inserting a second anchor into the target tissue such that the second anchor is disposed within the target tissue, wherein the second anchor is operably coupled to a second tether, wherein the urging the treatment device distally toward the defect further comprises urging the treatment device via the second tether, inserting a third anchor into the target tissue such that the third anchor is disposed within the target tissue, wherein the third anchor is operably coupled to a third tether, wherein the urging the treatment device distally toward the defect further comprises urging the treatment device via the third tether, and inserting a fourth anchor into the target tissue such that the fourth anchor is disposed within the target tissue, wherein the fourth anchor is operably coupled to a fourth tether, wherein the urging the treatment device distally toward the defect further comprises urging the treatment device via the fourth tether.

Example 11 relates to the assembly according to Example 10, wherein the target tissue comprises at least one of the annulus, a first adjacent vertebral body, and a second adjacent vertebral body, wherein the first and second anchors are disposed within the annulus.

Example 12 relates to the assembly according to Example 11, wherein the third and fourth anchors are disposed within at least one of the first and second vertebral bodies.

Example 13 relates to the assembly according to Example 11, wherein the third and fourth anchors are disposed within the annulus.

Example 14 relates to the assembly according to Example 8, wherein the urging the treatment device distally toward a defect in the annulus via the first tether further comprising inserting the first tether through an opening in the treatment device such that the urging the treatment device comprises urging the treatment device over the first tether.

Example 15 relates to the assembly according to Example 8, wherein the inserting the first anchor into the target tissue comprises inserting the first anchor through the defect or inserting the first anchor through a healthy portion of the target tissue.

In Example 16, an annulus repair system comprises an insertion needle comprising a lumen defined therethrough and an annulus treatment assembly comprising an integratable treatment device, a distal anchor sized to fit within the lumen of the insertion needle, and a tether. The tether comprises a distal length disposed through a first opening in the treatment device, a proximal length disposed through a second opening in the treatment device, and a middle length disposed through two openings in the distal anchor.

Example 17 relates to the assembly according to Example 16, further comprising a pushing device positionable through the lumen of the insertion needle.

Example 18 relates to a method of repairing a herniated annulus using the system of Example 16, the method comprising positioning the distal anchor within the lumen of the insertion needle, inserting the needle into the annulus such that a distal tip of the needle extends into an interior of the annulus, ejecting the distal anchor into the interior of the annulus, retracting the insertion needle, applying proximal tension to the tether to ensure securement of the distal anchor against an inner wall of the annulus, urging the proximal length of the tether proximally such that the treatment device is urged into contact with the annulus, and securing the treatment device to the annulus.

Example 19 relates to the method according to Example 18, wherein the ejecting the distal anchor further comprises urging the pushing device distally through the lumen, whereby the distal anchor is ejected.

In Example 20, an annulus repair system comprises an insertion device comprising an elongate body, a proximal handle coupled to a proximal end of the elongate body, a treatment device attachment mechanism disposed along a length of the elongate body, and an anchor attachment mechanism disposed at or near a distal end of the elongate body. The system further comprises an annulus treatment assembly comprising an integratable treatment device removably coupleable with the treatment device attachment mechanism, a distal anchor removably coupleable with the anchor attachment mechanism, and a tether operably coupled to the integratable treatment device and the distal anchor.

Example 21 relates to a method of repairing a herniated annulus using the system of Example 20, the method comprising inserting a distal end of the elongate body through a defect in the annulus such that the distal anchor is disposed in an interior of the annulus, releasing the distal anchor from the anchor attachment mechanism such that the distal anchor is disposed within the interior of the annulus, releasing the treatment device from the treatment device attachment mechanism, retracting the insertion device, urging the proximal length of the tether proximally such that the treatment device is urged into contact with the annulus, and securing the treatment device to the annulus.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

BRIEF DESCRIPTION OF THE DRAWINGS

FIG. 9 is a perspective view of an insertion device, according to one embodiment.

FIG. 10A is a perspective view of the insertion device of FIG. 9 with an annulus defect treatment assembly associated therewith prior to insertion, according to one embodiment.

12E is a perspective view of the distal anchor and treatment device of the treatment assembly of FIG. 12 being implanted in relation to an annulus, according to one embodiment.

12F is another perspective view of the distal anchor and treatment device of the treatment assembly of FIG. 12 being implanted in relation to the annulus, according to one embodiment.

FIGS. 13A-13D are various perspective views of a treatment device, according to one embodiment.

FIGS. 14A-14B are different perspective views of a treatment device, according to one embodiment.

FIGS. 15A-15C are top view of treatment devices of differing shapes, according to one embodiment.

Figure 16A:
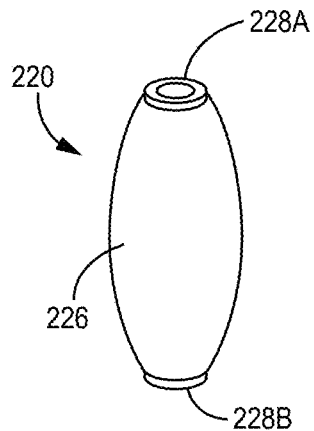

FIG. 16A is a perspective view of a treatment device in its insertion configuration, according to one embodiment.

Figure 16B:
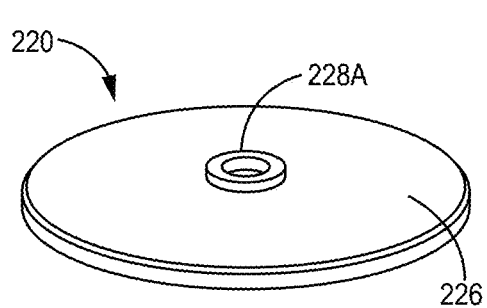

FIG. 16B is a perspective view of the treatment device of FIG. 16A in its deployed configuration, according to one embodiment.

Figure 16C:
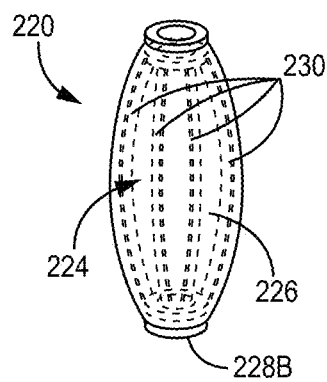

FIG. 16C is a perspective view of the treatment device of FIG. 16A in which the internal support body is visible in its insertion configuration, according to one embodiment.

Figure 16D:
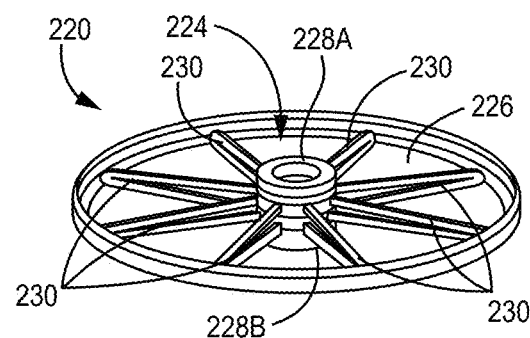

FIG. 16D is a perspective view of the treatment device of FIG. 16A in which the internal support body is visible in its deployed configuration, according to one embodiment.

Figure 16E:
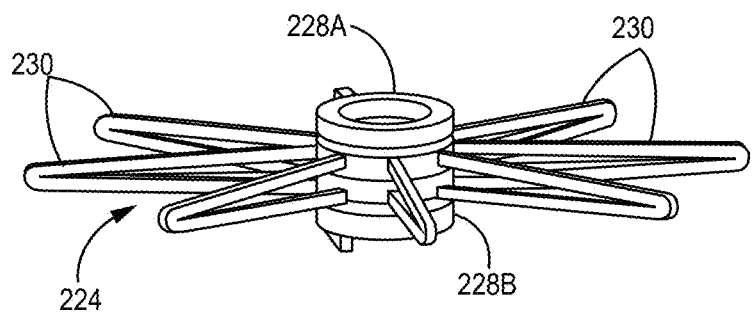

FIG. 16E is a perspective view of the support body of the treatment device of FIG. 16A, according to one embodiment.

Figure 16F:
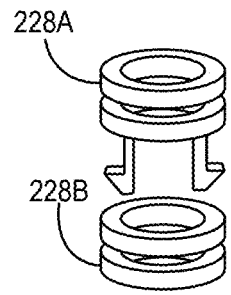

FIG. 16F is a perspective view of the hubs of the support body of the treatment device of FIG. 16A, according to one embodiment.

Figure 17A:
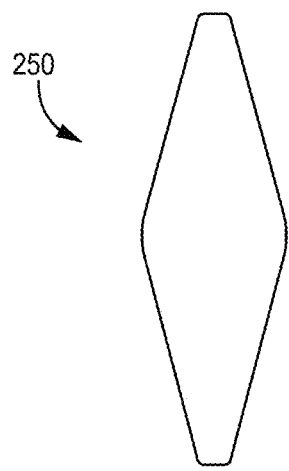

FIG. 17A is a top view of a treatment device, according to one embodiment.

Figure 17B:
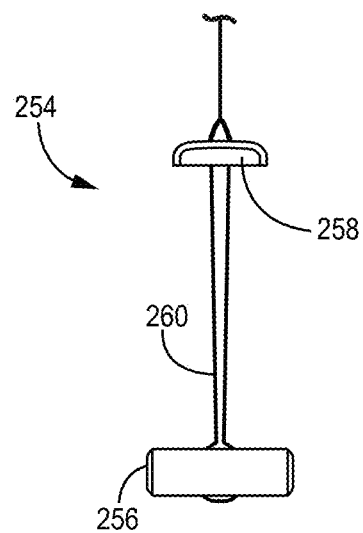

FIG. 17B is a side view of an anchoring assembly, according to one embodiment.

Figure 17C:
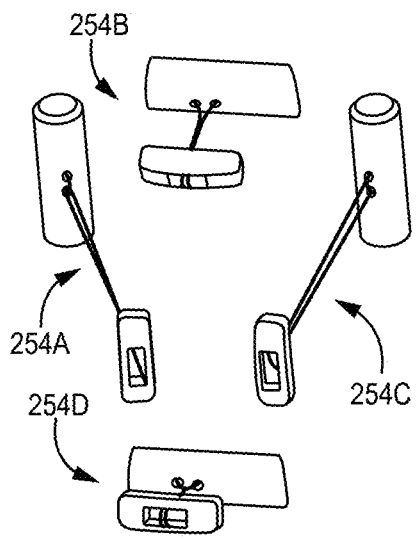

FIG. 17C is a perspective view of four anchoring assemblies positioned in relation to each other in a fashion similar to the position of the assemblies when attaching a treatment device at a target treatment site, according to one embodiment.

Figure 17D:
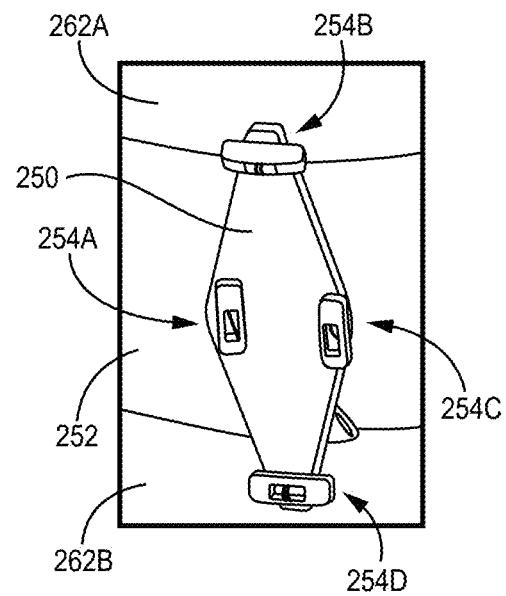

FIG. 17D is a perspective view of the treatment device of FIG. 17A and the four anchoring assemblies of FIG. 17C, according to one embodiment.

Figure 18A:
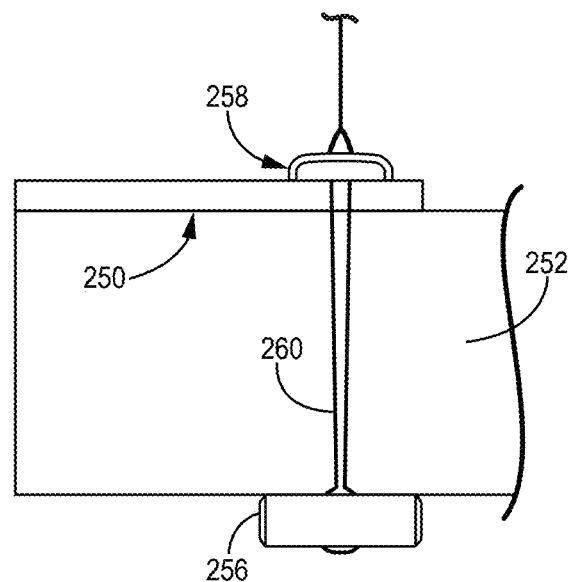

FIG. 18A is a cross-sectional view of an anchoring assembly attaching a treatment device to an annulus, according to one embodiment.

Figure 18B:
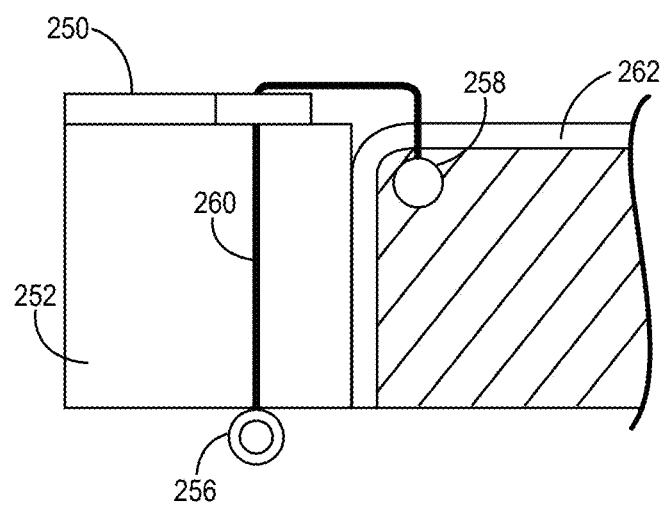

FIG. 18B is a cross-sectional view of another anchoring assembly attaching a treatment device to an annulus and a vertebral body, according to another embodiment.

Figure 19A:
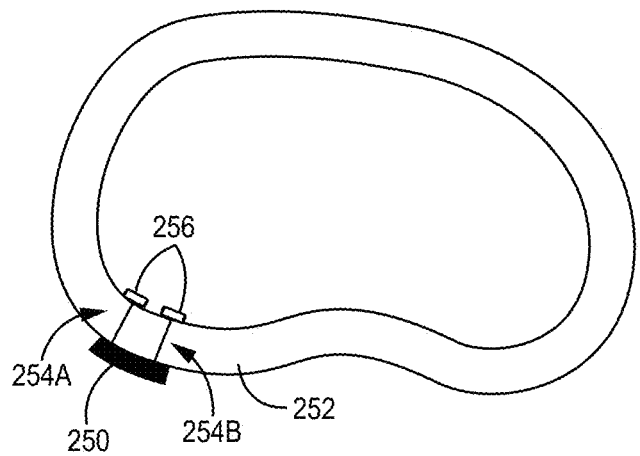

FIG. 19A is a cross-sectional view of a treatment device attached to an annulus wall via two anchor assemblies attached to the same wall, according to one embodiment.

Figure 19B:
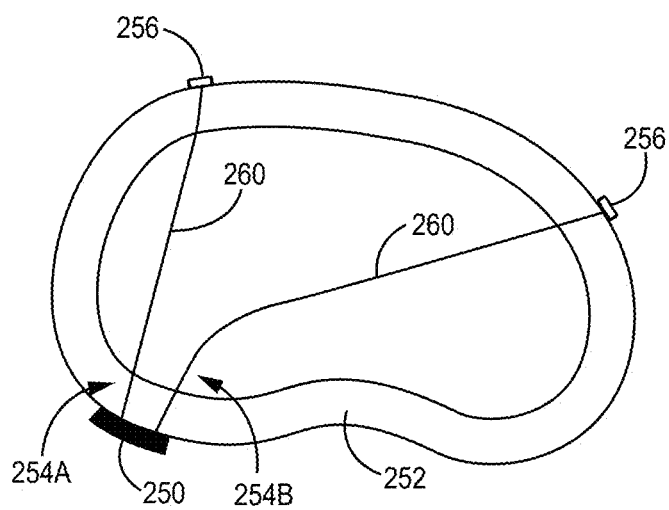

FIG. 19B is a cross-sectional view of a treatment device attached to an annulus wall via two anchor assemblies attached to an opposing wall, according to another embodiment.

Figure 20A:
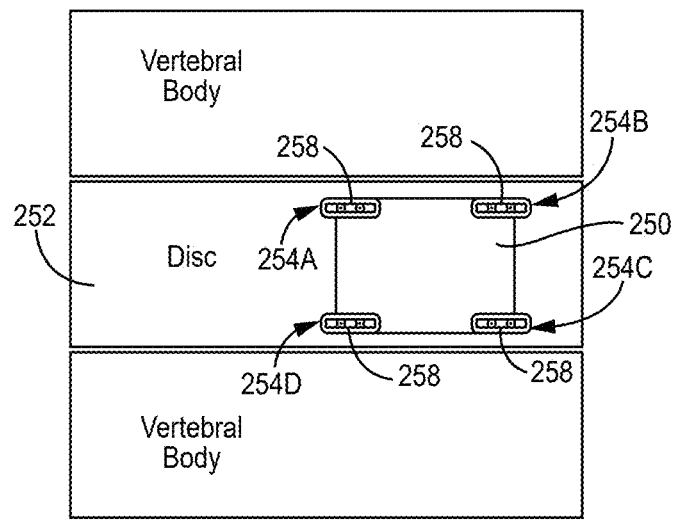

FIG. 20A is a top view of a treatment device attached to a target annulus via four anchoring assemblies attached to the annulus, according to one embodiment.

Figure 20B:
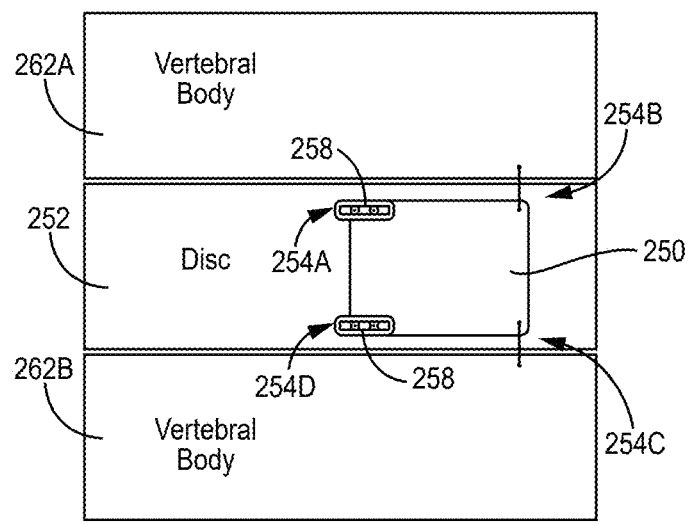

FIG. 20B is a top view of a treatment device attached to a target annulus via two anchoring assemblies attached to the annulus and two anchoring assemblies attached to the annulus and the adjacent vertebral bodies, according to one embodiment.

Figure 20C:
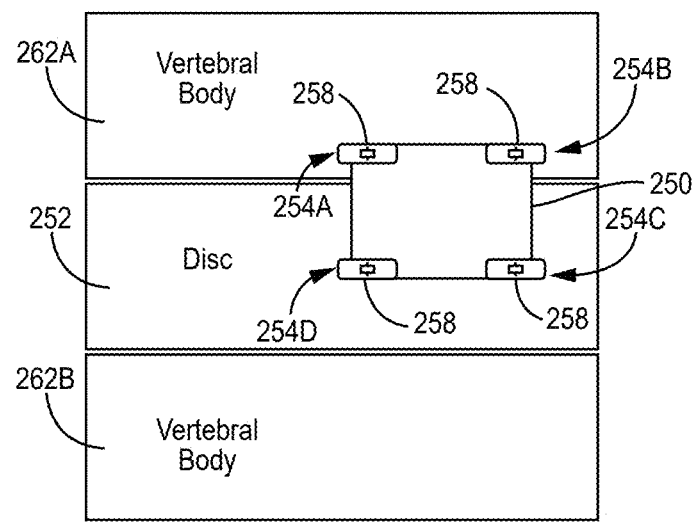

FIG. 20C is a top view of a treatment device attached to a target annulus and adjacent vertebral body via two anchoring assemblies attached to the annulus and two anchoring assemblies attached to the vertebral body, according to one embodiment.

Figure 20D:
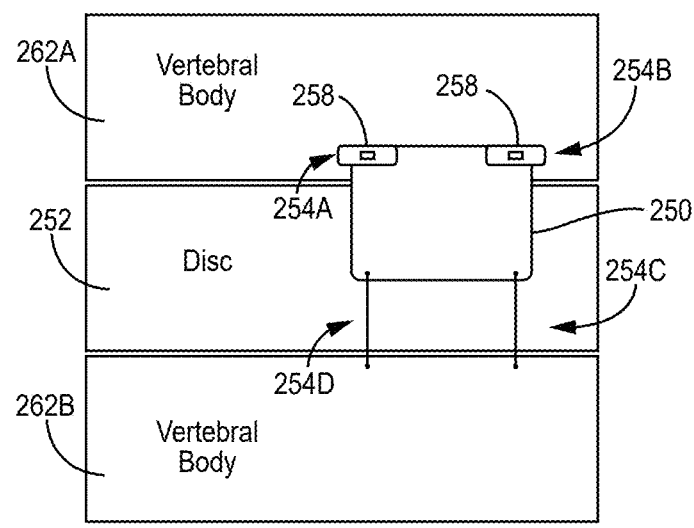

FIG. 20D is a top view of a treatment device attached to a target annulus and adjacent vertebral body via two anchoring assemblies attached to the vertebral body and two anchoring assemblies attached to the annulus and the vertebral body, according to one embodiment.

Figure 20E:
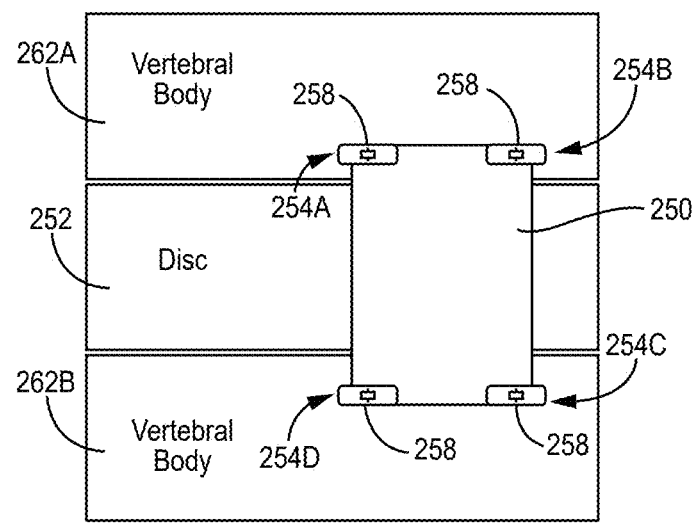

FIG. 20E is a top view of a treatment device disposed against a target annulus via four anchoring assemblies attached to the adjacent vertebral bodies, according to one embodiment.

Figure 20F:
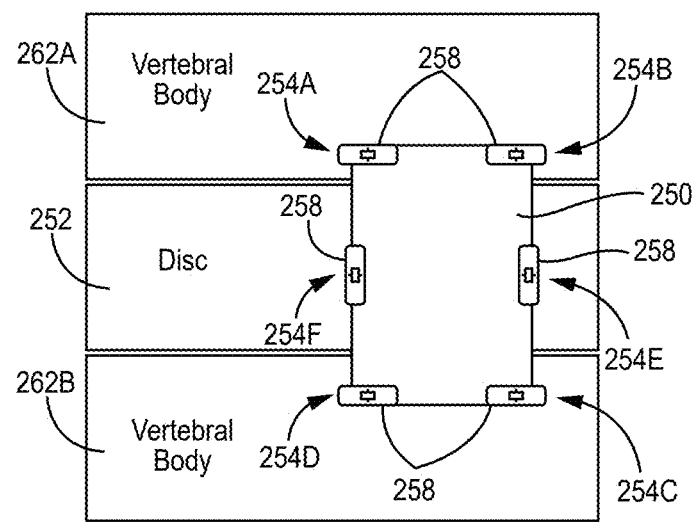

FIG. 20F is a top view of a treatment device attached to a target annulus via four anchoring assemblies attached to the adjacent vertebral bodies and two anchoring assemblies attached to the annulus, according to one embodiment.

Figure 20G:
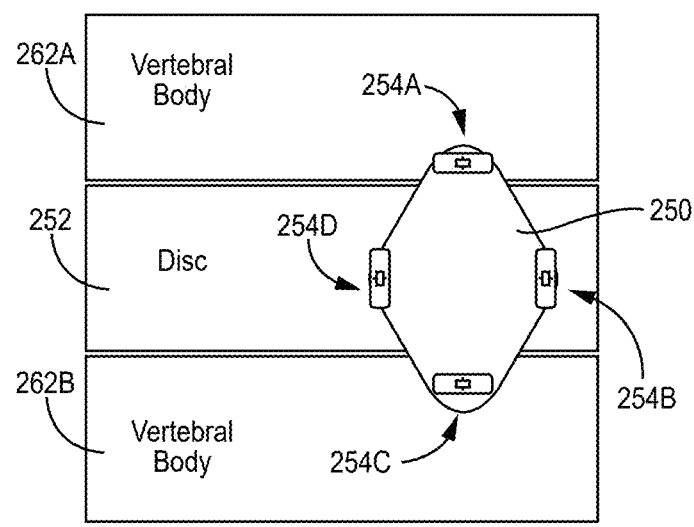

FIG. 20G is a top view of a treatment device attached to a target annulus via two anchoring assemblies attached to the adjacent vertebral bodies and two anchoring assemblies attached to the annulus, according to one embodiment.

DETAILED DESCRIPTION

The various embodiments herein relate to devices, systems, and methods for deploying and attaching an annulus fibrosus repair device (also referred to as a "treatment device," "treatment patch," "repair body," or "repair patch") to the inside and/or outside of a herniated intervertebral disc in order to close the herniation defect and restore integrity to the disc. Several embodiments are illustrated and described, as set forth herein.

In some implementations, the treatment device is an integratable device, meaning that the device is made of a material that allows for integration of the device with the native tissue, as will be discussed in additional detail below. Other types of repair devices are also disclosed or contemplated herein. Additional embodiments herein relate to various methods for affixing/attaching a repair device to the outside of a herniated disc. In this sense, the device serves as a covering body over the outside of the herniation defect to prevent further herniation of tissue and loss of the nucleus pulposus contained within the disc. In addition, additional embodiments include methods for affixing/attaching a repair device to the inside of a herniated disc. Further, certain implementations herein relate to method of first inserting an anchor into the target area and then implanting the repair device.

In one exemplary embodiment as shown in FIGS. 1-7, a method of deploying and attaching a repair device to an external surface of an annulus is provided. The method involves first securing or anchoring at least one tether (such as, for example, a suture) into or onto a target spinal disc to be repaired and/or to one or both of the adjacent vertebral bodies and then using the tether(s) as a means to guide the therapeutic device (such as a patch) and secure the device in place at the target location on the spinal disc. Alternatively, the target biological structure to be repaired can be some structure other than the spinal disc.

Figure 1:
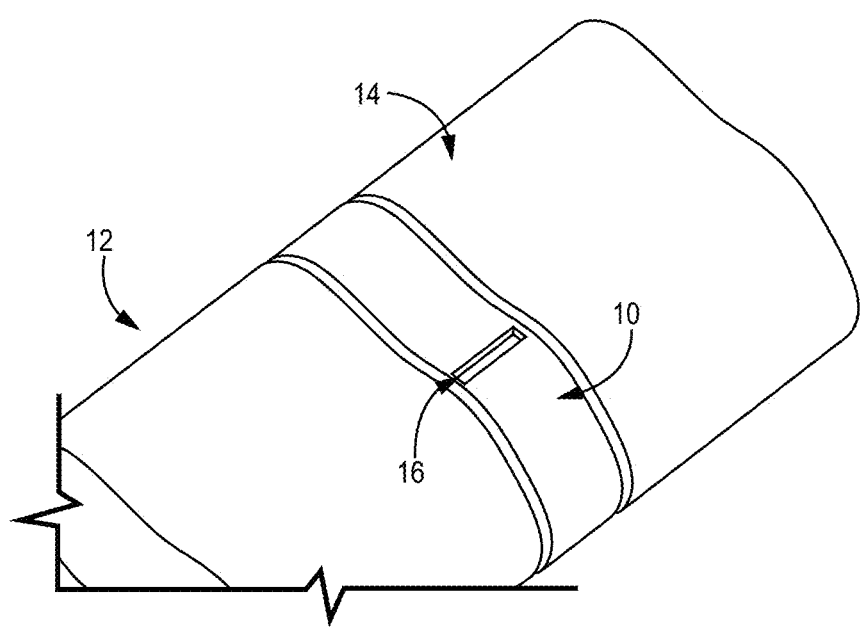
FIG. 1 is a perspective view of a defect in an intervertebral disc (or annulus) disposed between two adjacent intervertebral bodies.

In one specific implementation as shown in FIG. 1, the target structure is a herniated intervertebral disc (also referred to herein as an "annulus" or "annulus fibrosus") 10 disposed between two vertebral bodies 12, 14. As shown, the herniated disc or annulus 10 has a defect (typically an opening) 16 formed therein.

As part of the method, access to the target disc 10 is first attained. In certain embodiments, any known access methods such as open access, access through dilation portals, or endoscopic access, can be used.

Figure 2:
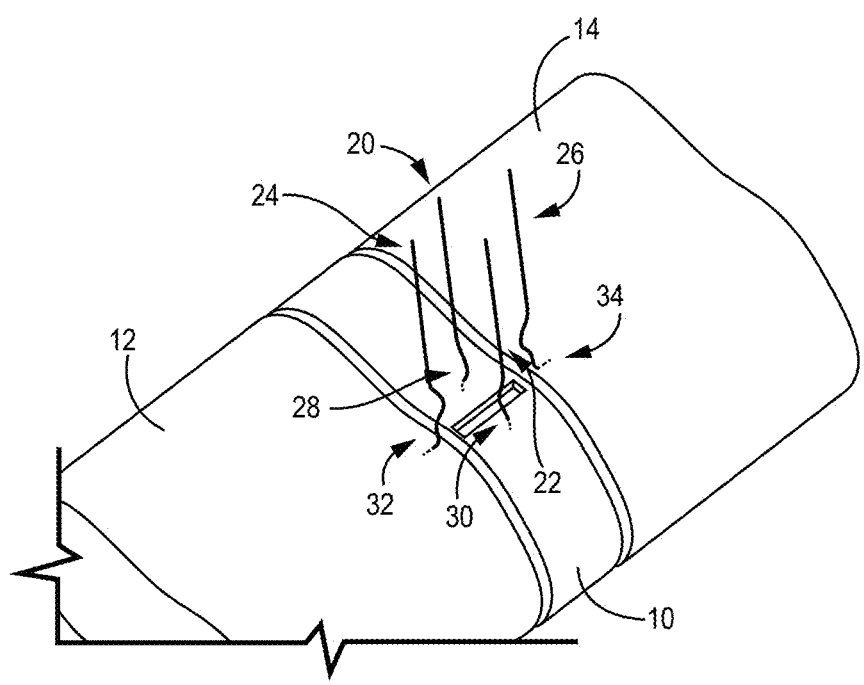
FIG. 2 is a perspective view of four tethers implanted in the area of the annulus, according to one embodiment.

As shown in FIG. 2, in this exemplary embodiment, four tethers 20, 22, 24, 26 are attached to the target tissues or bodies. More specifically, tethers 20, 22 are attached to the annulus 10, while tethers 24, 26 are attached to the adjacent vertebral bodies 12, 14. Each tether 20, 22, 24, 26 can be a standard suture or an elastic suture. Alternatively, each tether 20, 22, 24, 26 can be any other known elongate string, cord, or the like for use in the type of attachment procedures described or contemplated herein. Each tether can be made of biological materials such as collagen fibers, other extracellular matrix-derived proteins, catgut, silk, and the like, synthetic and/or polymeric materials such as PET, HMWPE, nylon, polypropylene, polyglycolic acid, polyglactin, poliglecaprone, polydioxanone, polyglyconate, polybutester, and the like, polymeric materials combined with metal wires, or alternatively can be made of any known bioresorbable or other material typically used in sutures or tethers. In a further embodiment, the tethers can be made of a variety of natural or synthetic materials or a combination thereof. In one embodiment, the distal end of each tether 20, 22, 24, 26 has an anchor 28, 30, 32, 34 or other attachment device or mechanism attached thereto. For example, in one embodiment, each anchor 28, 30, 32, 34 is a known T-bar anchor 28, 30, 32, 34. Alternatively, any known anchor or attachment device for attaching a tether to a target tissue.

In one embodiment, the attachment of the tethers 20, 22, 24, 26 can be carried out using known introducing devices and known methods for introduction into or through the annulus 10 or the vertebral bodies 12, 14. The placement of the tethers 20, 22, 24, 26 with the attachment mechanisms 28, 30, 32, 34 prior to introducing the treatment body allows for optimum suture placement while minimizing access requirements such as bone removal or increased access site size. That is, placement of the tethers 20, 22, 24, 26 allows for each visualization of the target site during the procedure.

Alternatively, a single tether, two tethers, three tethers, five tethers, six tethers, or any number of tethers (and related attachment mechanisms) can be used.

Figure 3:
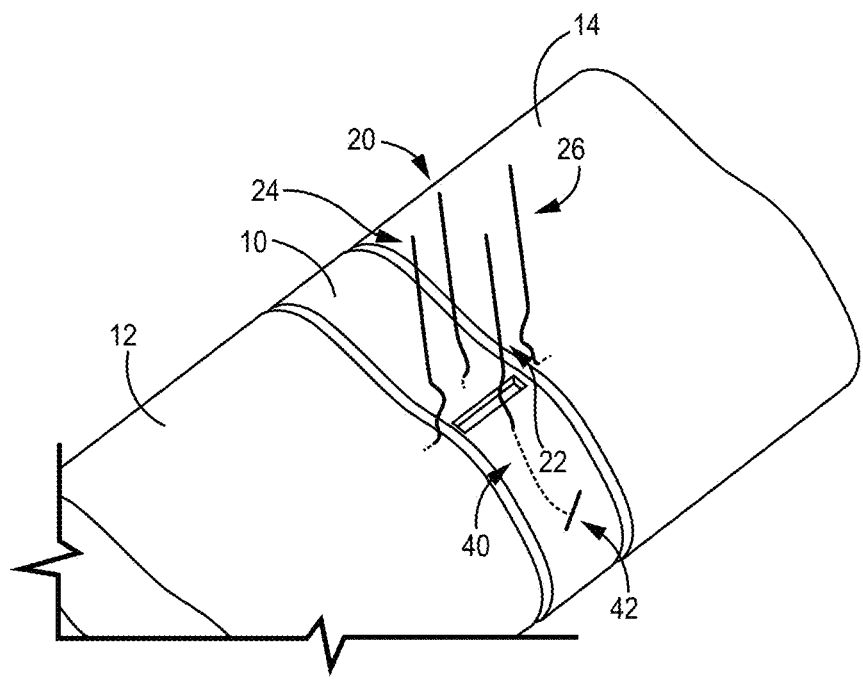
FIG. 3 is a perspective view of the four tethers implanted in the area of the annulus, with one of the tethers anchored to an external surface of the annulus, according to one embodiment.

In some alternative implementations, the distal end of one or more of the tethers 20, 22, 24, 26 can be inserted into the annulus 10 and advanced through the lateral wall of the annulus 10 such that the distal end extends out of the outer surface of the annulus 10. For example, as shown in FIG. 3, the tether 22 is inserted into the annulus 10 and advanced such that a distal portion 40 of the tether 22 extends through the lateral wall of the annulus 10 and extends out of the outer surface of the annulus 10. As such, the anchor 42 is attached to the distal end of the tether 22 such that the anchor 42 is disposed against or adjacent to the outer wall of the annulus 10 as shown.

Figure 4:
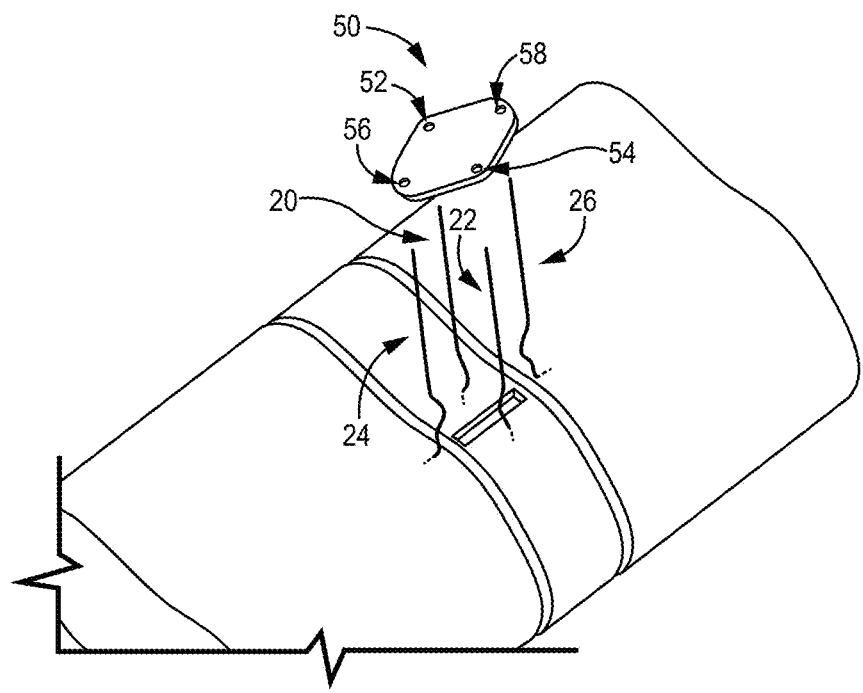
FIG. 4 is a perspective view of the four tethers implanted in the area of the annulus, with a treatment device positioned such that it can be inserted over the four tethers as part of the implantation method, according to one embodiment.

Once the one or more tethers are positioned as desired in relation to the target site, a treatment body 50 can be positioned over the tethers. For example, as shown in FIG. 4, the treatment body 50 is positioned adjacent to the tethers 20, 22, 24, 26 such that the tethers 20, 22, 24, 26 can be inserted into and through the corresponding openings 52, 54, 56, 58 in the body 50. In such embodiments, the one or more tethers can be used as guides to ensure proper placement of the treatment body at the target site.

Figure 5:
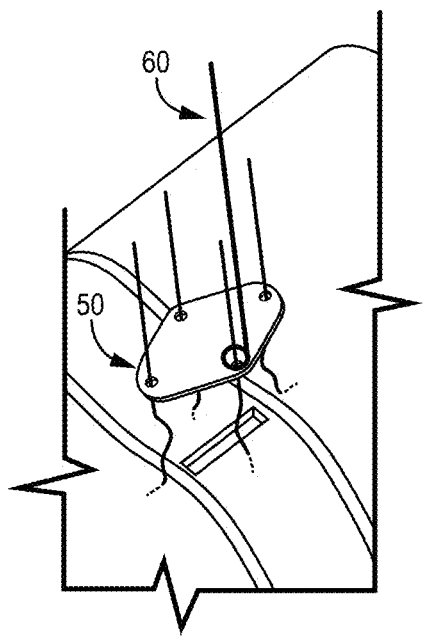
FIG. 5 is a perspective view of the four tethers implanted in the area of the annulus with the treatment device being advanced distally over the tethers with an advancement tool, according to one embodiment.
Figure 6:
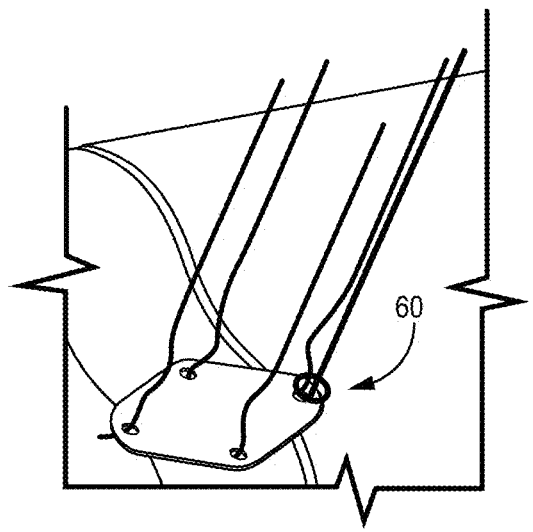
FIG. 6 is a perspective view of the four tethers with the treatment device advanced into contact with the annulus, according to one embodiment.

Once the treatment patch 50 is positioned over the tethers 20, 22, 24, 26 as discussed above, the patch 50 can be advanced distally along the tethers 20, 22, 24, 26 toward the target site as shown in FIG. 5. In certain embodiments, the patch 50 can be advanced over the tethers 20, 22, 24, 26 using a known advancement tool 60. For example, in the specific embodiment as shown, the advancement tool 60 is a standard knot pusher 60. The advancement tool 60 allows the surgeon to advance the patch 50 past obstructions at the target site such as, for example, nerve bundles, tissue, and bone.

In certain embodiments, if additional force is required to ensure proper placement of the patch 50 (and advancement past any obstructions), additional force can be applied to the advancement tool 60 while pulling proximally on one or more of the tethers 20, 22, 24, 26 until the patch 50 is urged past the clinically established access area and disposed in the desired position against or adjacent to the defect at the target site.

Figure 7:
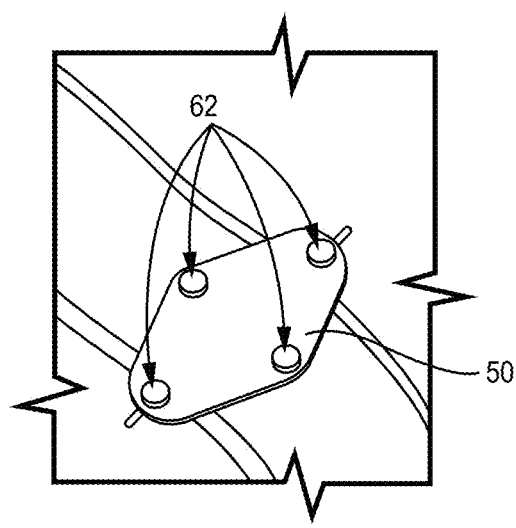
FIG. 7 is a perspective view of the treatment device implanted in contact with the annulus, according to one embodiment.

According to various implementations, one or more retention mechanisms can be used to hold the patch 50 in the desired position. For example, in one embodiment as shown in FIG. 7, four cinch rings 62 are advanced over the tethers 20, 22, 24, 26 (that is, each ring is advanced over one of the tethers) and fixed in place according to known methods. Alternatively, any retention mechanism(s) can be used to hold the patch 50 in position. In certain embodiments, one or more of the tethers 20, 22, 24, 26 can be urged proximally to apply tension while urging the cinch rings 62 (or other retention mechanism(s)) distally into contact with the patch 50.

Alternatively, any combination of steps for inserting and positioning a treatment body that involves first inserting and attaching one or more tethers is contemplated herein. As noted above, the advantages of inserting the tether(s) first include easy visualization, optimum suture and anchor placement, and minimization of access requirements such as bone removal or increased access site size. Further, it allows for an easier attachment method using existing tools, negates the need to hold the patch in position as the tether is applied, and reduces the risks of nerve injury as a result of inserting the tether(s) (as a result of the better visualization). In addition, it allows for tethers to be placed in the lateral portion of the target disc and vertebral bodies some distance from the defect. In contrast, known methods typically place suture/anchors in the annulus very close to the defect, which may also be diseased and not provide adequate support. Additionally, the method of inserting the tether(s) first allows for use of a treatment body that is larger than the area to be repaired and provides the ability to overlap into the soft tissue at the vertebral body/disc interface. Further, the method makes it possible to positively verify the anchor/tether integrity (i.e., how well it's attached) before the treatment body is introduced. In contrast, known methods place the therapeutic device first such that any anchor attachment failure is only discovered when the therapeutic device subsequently drifts or detaches at some later time. Another advantage of the method herein is that training is minimized and special skills beyond normal surgical procedures are not required.

Figure 8A:
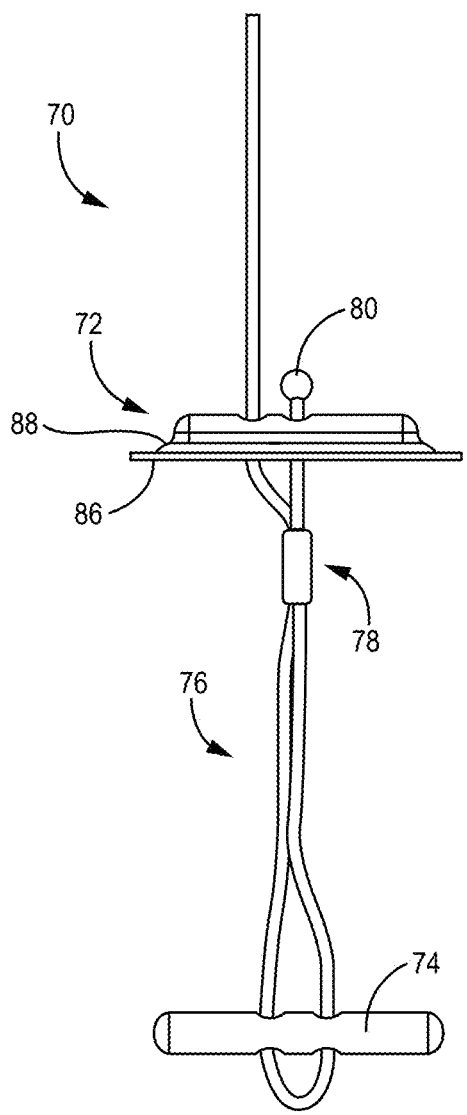
FIG. 8A is a side view of a annulus defect treatment assembly, according to one embodiment.
Figure 8B:
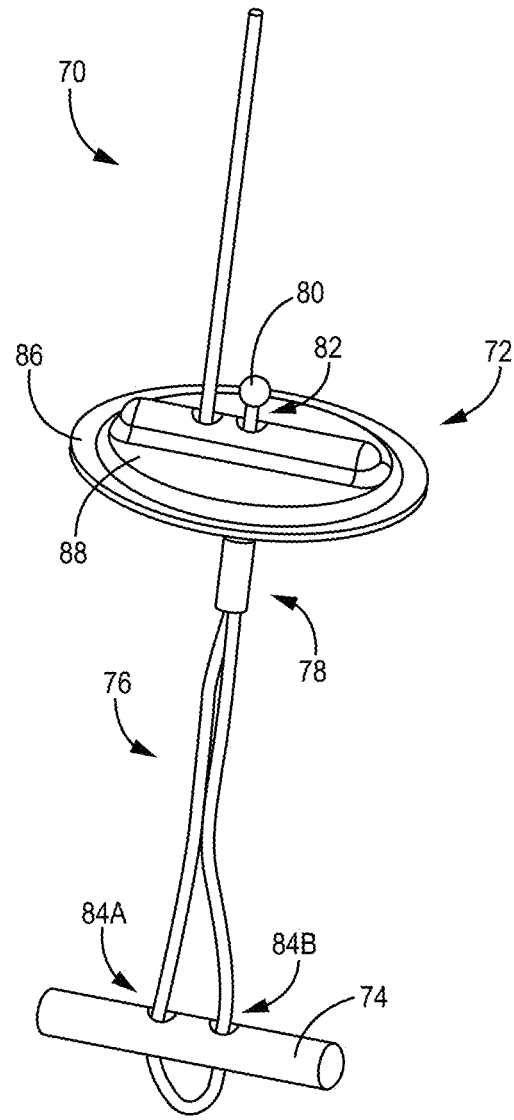
FIG. 8B is a perspective view of the annulus defect treatment assembly of FIG. 8A, according to one embodiment.

One specific repair assembly 70 for use in the above method or other repair methods is shown in FIGS. 8A and 8B, according to one embodiment. The assembly 70 has a treatment device 72, an anchor 74, a tether 76 coupling the device 72 and the anchor 74, and a one-way coupling mechanism 78 attached to the tether 76.

The tether 76 is attached at one end to the treatment device 72. More specifically, in this exemplary embodiment, the first or distal end of the tether 76 has a bulb, ball, or knot 80 attached thereto such that the tether 76 is slidably disposed through an opening 82 in the treatment device 72 with the knot 80 disposed on the proximal side of the treatment device 72 such that the knot 80 cannot pass through the opening 82. Alternatively, the structure 80 can be any known structure that prevents the end of the tether 76 from passing through the opening 82. Alternatively, the tether 76 can be attached to the treatment device 72 via any known mechanism or method.

In addition, the tether 76 is slidably coupled to the anchor 74. That is, in this specific implementation, a length of the tether 76 is slidably disposed through two openings 84A, 84B defined in the anchor 74 as shown such that the tether 76 is threaded through one of the openings and then back in the other direction through the other such that the tether 76.

Further, according to one embodiment, two portions of the tether 76 are also coupled to the one-way coupling mechanism 78 at a point between the treatment device 72 and the anchor 74 as shown. More specifically, in the specific implementation as shown, the two portions of the tether 76 are disposed through the one-way coupling mechanism 78 such that the proximal portion of tether 76 can be urged proximally through the coupling mechanism 78, as will be described in additional detail below.

In one embodiment, the treatment device 72 as shown has a treatment or patch body 86 and a proximal support body 88 attached to the patch body 86. More specifically, the proximal support body 88 in this implementation is a substantially rigid disk 88 with an elongate support bar 90 extending along the proximal surface thereof to provide additional structural support to the disk 88. Alternatively, the support body 88 can have any level of rigidity so long as it is more rigid than the treatment patch body 86. As discussed elsewhere herein with respect to other similar treatment devices, the support body 88 in this implementation provides sufficient rigidity to the treatment device 72 such that the treatment device 72 can serve not only as the treatment device 72, but also as a proximal anchor for the assembly 70. In a further alternative, any proximal support structure of any rigidity can be provided, with various alternative options described in further detail below. In one implementation, the support body 88 is made of metals such as titanium and the like, bioresorbable materials such as bioresorbable metals (such as iron, magnesium, zinc-based metals, or the like), and or other known bioresorbable materials, polymeric materials such as PEEK, PET, carbon fiber reinforced PEEK, polylactic acid, poly-L-lactic acid, polyglycolic acid, ceramic, and the like, and/or any other materials used for similar implantable structures. In a further alternative the treatment device 72 can be any treatment body according to any implementation disclosed or contemplated elsewhere herein, including, for example, a treatment body without a separate support structure or a treatment body with a support structure disposed within the treatment body such that the treatment body can cover or encase the entire support body.

According to certain embodiments, the treatment assembly 70 can be urged toward and positioned in the target area using an insertion device. More specifically, the assembly 70 can be implanted using a delivery needle 90 such as the needle 90 depicted in FIG. 9 with a lumen 92 defined therethrough and distal 94 and proximal 96 openings in fluidic communication with the lumen 92. Alternatively, any known insertion or delivery device with a lumen defined therein can be used.

The assembly 70 can be positioned within the delivery device 90 prior to insertion into the target site of the patient. More specifically, as shown in FIG. 10A, according to one embodiment, the anchor 74 is disposed within the lumen 92 near the distal end of the delivery device 90 with the rest of the assembly 70 disposed outside of the needle 90 as shown. That is, the tether 76 extends out of the distal opening 94 such that the remainder of the assembly 70 is disposed along the length of and adjacent to the exterior of the needle 90 as shown. Further, in certain embodiments, a pushing device 100 can be provided that is positioned through the lumen 92 such that the pushing device 100 can be used to urge the assembly 70—or a portion thereof, such as the anchor 74—out of the distal opening 94 of the needle 90. In one embodiment, the pushing device 100 is a known push rod 100. Alternatively, any known pushing device 100 can be used.

Figure 10B:
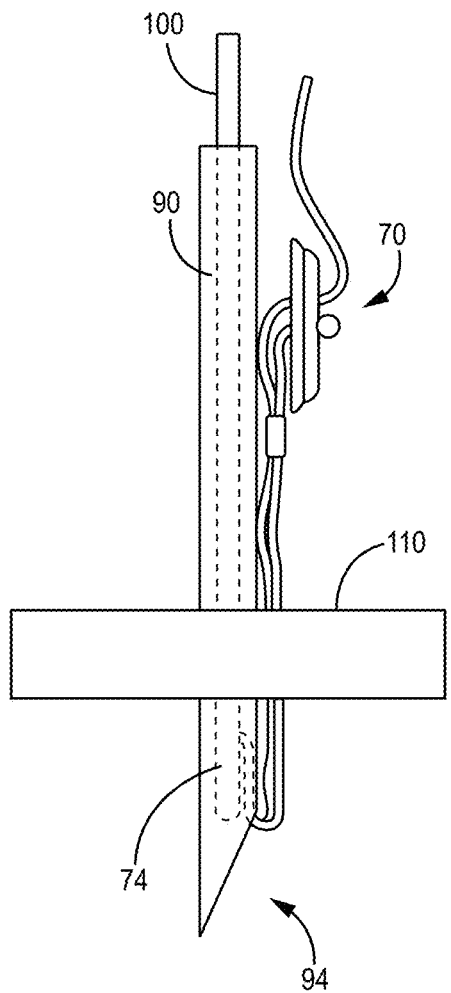
FIG. 10B is a side view of the insertion device and assembly of FIG. 10A being inserted into an annulus, according to one embodiment.

FIGS. 10B-10E depict the insertion and positioning steps of this exemplary method, according to one embodiment. As shown in FIG. 10B, the needle 90 with assembly 70 attached thereto is inserted into the target disc 110. In one embodiment, the distal end of the needle 90 can be inserted into the target annulus 110 anywhere on the external surface of the annulus 110 at a predetermined location in relation to the target defect (not shown). Alternatively, the needle 90 can be inserted through the defect in the annulus 110. In those methods in which the needle 90 is inserted through the defect, the anchor 74 can be positioned outside of the needle 90, thereby allowing for a larger anchor 74 or an anchor that expands in two or more directions (because it does not need to fit within the lumen 92).

Figure 10C:
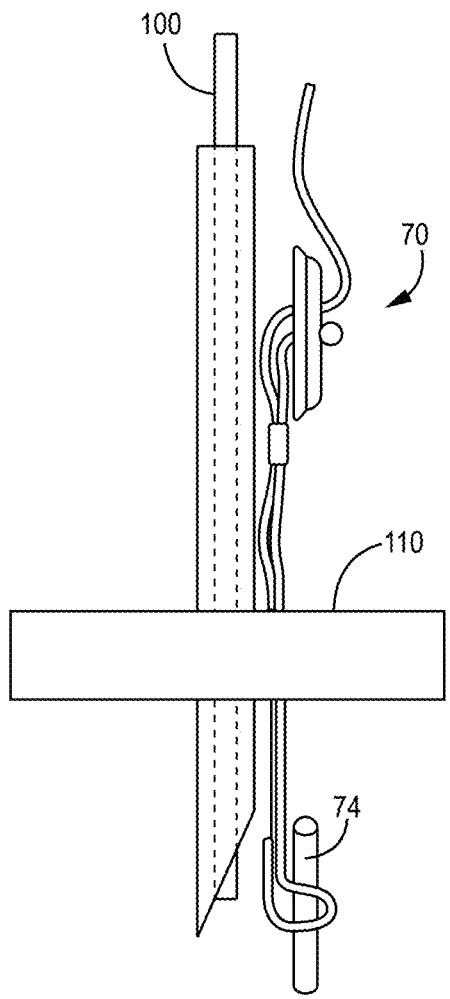
FIG. 10C is a side view of the distal anchor of the assembly of FIG. 10A being ejected from the insertion device, according to one embodiment.

Once the needle 90 is inserted into the annulus 110 and positioned as desired, according to one embodiment, the push rod 100 is urged distally in the lumen 92 such that the anchor 74 is urged out of the distal opening 94 of the needle 90, as shown in FIG. 10C.

Figure 10D:
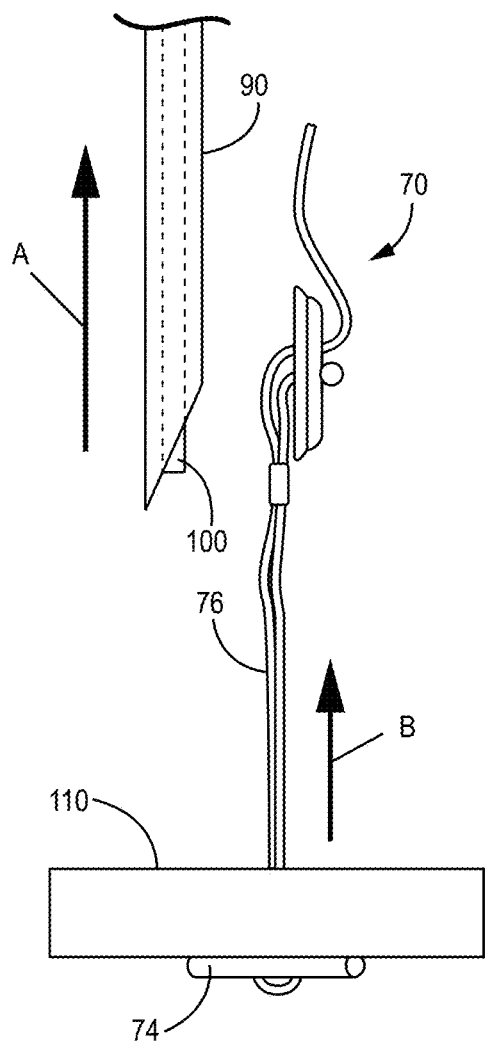
FIG. 10D is a side view of the insertion device of FIG. 10A being retracted with the distal anchor implanted within the annulus, according to one embodiment.

Once the anchor 74 has been ejected from the lumen 92 of the needle 90, the needle 90 and push rod 100 are retracted as shown with arrow A (urged proximally out of the ejection site and away from the patient) in FIG. 10D. With the needle 90 and push rod 100 removed, only the treatment assembly 70 remains, with the anchor 74 disposed on within the annulus 110 as shown.

At this point, the stability of the anchor 74 attachment to the annulus 110 can be tested to confirm that the anchor 74 is positioned correctly. That is, the tether 76 is urged proximally by the surgeon (as represented by arrow B in FIG. 10D) to confirm that the anchor 74 is disposed against the interior of the annulus wall 110 as desired. If the anchor 74 is positioned properly, anchor 74 will provide sufficient resistance against the force applied by the surgeon. Alternatively, if the anchor 74 is not positioned properly, the anchor 74 will not provide sufficient resistance.

Figure 10E:
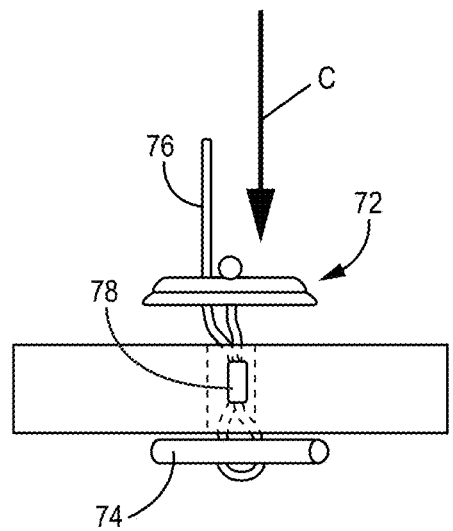
FIG. 10E is a side view of the assembly of FIG. 10A with the treatment device being urged toward the target annulus, according to one embodiment.

Once the stability of the anchoring of the treatment assembly 70 to the annulus 110 has been confirmed, the treatment device 72 is urged into place at the target site, as best shown in FIG. 10E. That is, the proximal end of the tether 76 is tensioned (or urged proximally) by the surgeon, thereby causing the treatment device 72 to be urged distally (as represented by arrow C) as a result of the cinching action of the assembly 70. More specifically, the proximal urging of the proximal end of the tether 76 causes the proximal end of the tether 76 to move proximally, thereby causing the distal end of the tether 76 (and thus the treatment device 72) to be pulled toward the anchor 74 as the tether 76 threads through the two openings 84A, 84B thereof. In certain embodiments, it is the one-way coupling mechanism 78 that allows the distal end of the tether 76 to be pulled toward the anchor (or "shortened") until the distal side of the treatment device 72 is in contact with the annulus 110 at the target site. While the one-way coupling mechanism 78 allows the distal portion of the tether 76 to move toward the anchor 74, it does not allow the distal portion of the tether 76 to move away from the anchor 74, thereby holding the treatment device 72 in place against the annulus 110 as desired.

Figure 11:
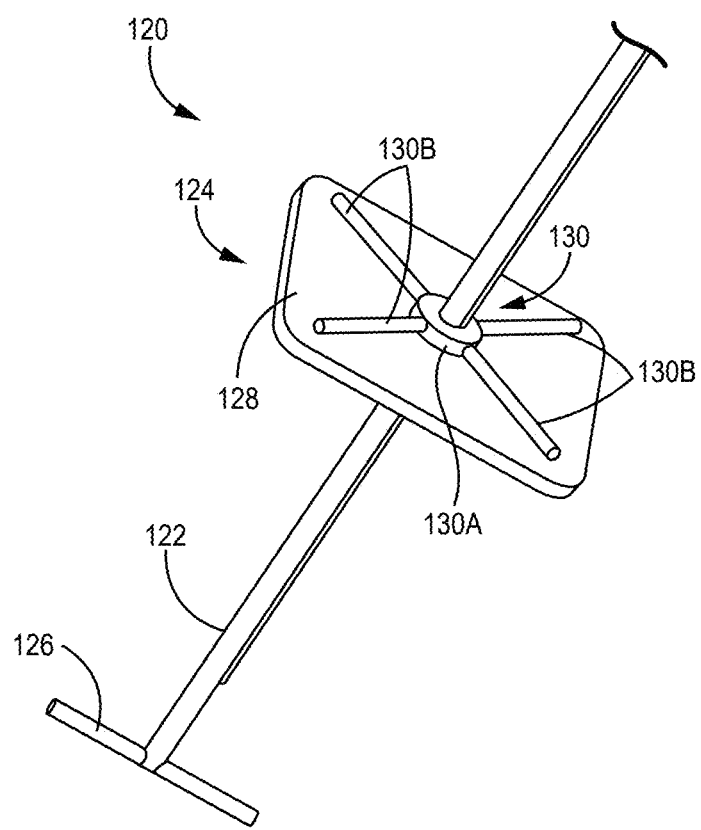
FIG. 11 is a perspective view of another insertion device with a treatment assembly attached thereto, according to another embodiment.

According to a further implementation, an alternative treatment assembly 120 is shown in FIG. 11 that can be used to perform the method described above is provided. More specifically, the treatment assembly 120 operates in a fashion similar to the assembly 70 discussed above. In contrast to the assembly of FIGS. 8A-10E, the assembly 120 in FIG. 11 has a delivery needle 122, a treatment body 124 attached along the length of the delivery needle 122, and a distal anchor 126 attached to or near the distal end of the needle 122. More specifically, in certain embodiments, the distal anchor 126 can be disposed within the needle 122 (such that the needle 122 can be inserted through the annulus) and then urged out of the distal end thereof during the procedure. Alternatively, the distal anchor 126 can be attached to or disposed adjacent to an outer surface of the needle 122 (in which case, the needle 122 is typically inserted through the defect). According to one embodiment, the treatment body 124 has a treatment patch 128 and a proximal support 130, wherein the proximal support 130 has a central hub 130A with four prongs 130B extending therefrom. Alternatively, any treatment body 124 can be incorporated into this assembly 120. In use, the delivery needle 122 and distal anchor 126 are inserted into the defect, at which point the treatment body 124 is advanced along the length of the delivery needle 122, positioned against the defect, and anchored in place in a similar fashion as described above. One potential benefit of this embodiment is that, because they are coupled to the needle 122, the orientation of the treatment body 124 and the distal anchor are known and can be maintained relative to the defect throughout the procedure.

Figures 12A, 12B:
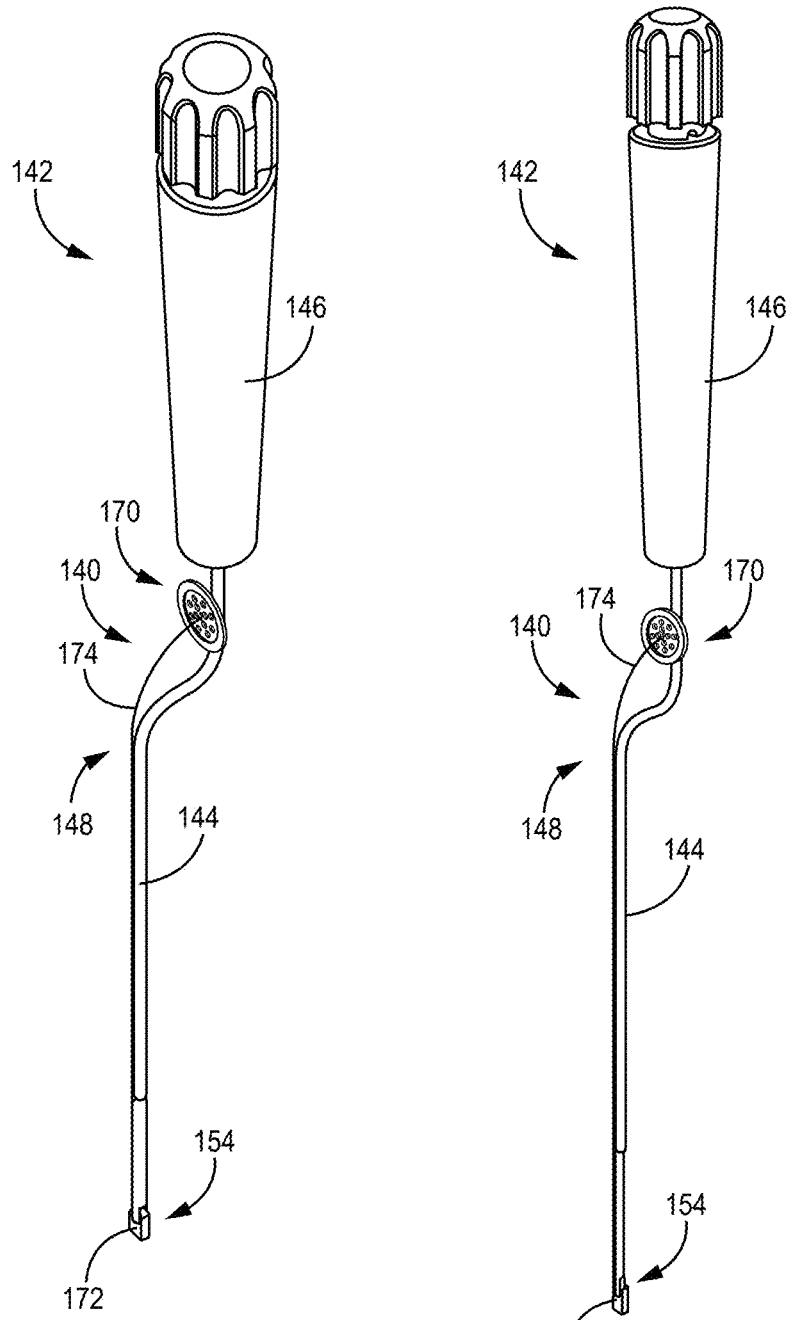
FIG. 12A is a perspective view of yet another insertion device with a treatment assembly attached thereto, according to a further embodiment.
FIG. 12B is another perspective view of the insertion device of FIG. 12A, according to one embodiment.

Another treatment assembly 140 and insertion device 142 is depicted in FIGS. 12A and 12B, according to another embodiment. The insertion device 142 has an elongate body 144 and a proximal handle 146 as shown. The elongate body 144 has at least one tether attachment structure 148 disposed along the length of the body 144 as best shown in FIG. 12C. In one embodiment, the attachment structure 148 is a clamp 148 that can releasably receive the tether 174 of the treatment assembly 140 such that the clamp 148 frictionally retains the tether 174 until sufficient force is applied to urge the tether 174 from the clamp 148. Alternatively, the attachment structure 148 can be any known attachment structure that allows for releasable attachment of the tether 174 as described herein.

In addition, the body 144 has a treatment body attachment structure (not shown) along the length of the body 144 as well, such that the treatment body 170 of the treatment assembly 140 can be removably coupled to the elongate body 144. Alternatively, the treatment body 170 is not attached to the delivery device 142 According to certain embodiments such as the exemplary embodiment as shown, the elongate body 144 has a curve or bend 150 along the length thereof such that the proximal handle 146 is offset from the distal portion of the elongate body 144, thereby allowing easy visualization of the defect site by the surgeon while inserting and placing the treatment body 170. In other words, the curve 150 results in the handle 146 being non-coaxial with the distal portion of the elongate body 144 as shown. In addition, the elongate body 144 has a tether channel 152 defined along the length of the body 144 such that the proximal end of the tether 174 can be received within the channel 152 as best shown in FIG. 12C. Further, the device 142 has an anchor attachment structure 154 disposed at a distal end of the elongate body 144 such that the anchor 172 of the treatment assembly 140 can be removably coupled to the distal end of the elongate body 144 as shown in FIGS. 12A, 12B, and 12D. In one embodiment, the anchor attachment structure 154 is a notch 154 defined at the distal end of the elongate body 144 to which the anchor 172 can be releasably attached.

The treatment assembly 140 is substantially similar to the assembly 70 discussed above. The assembly 140 has a treatment body 170, an anchor 172, and a tether 174 coupling the body 170 and the anchor 172. In use, the insertion device 142 described above can be used to position the treatment assembly 140 as desired to place the treatment body 170 at the target site in a similar fashion to the other methods described herein. More specifically, the distal end of the insertion device 142 is inserted through the defect and the distal anchor 172 is detached from the insertion device 142 such that the distal anchor 172 is disposed within the annulus. At this point, the treatment body 170 is released from the attachment structure (not shown), the insertion needle 142 is retracted, and the treatment body 170 is urged distally to the treatment site using the tether 174 in a fashion similar to the various methods described elsewhere herein.

Figure 12E:
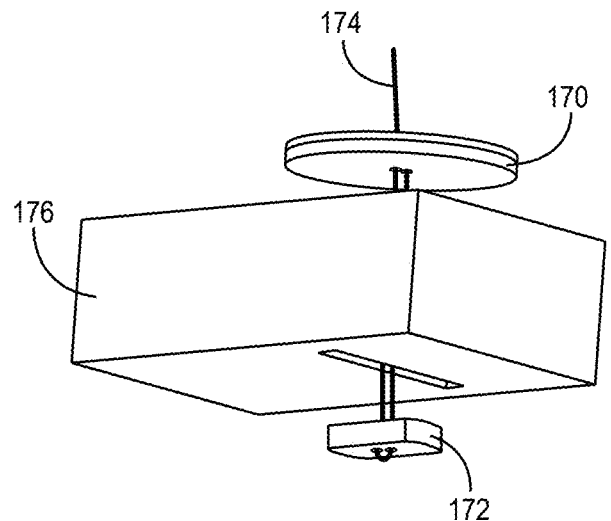
FIG. 12C is an expanded perspective view of a portion of the elongate body of the insertion device of FIG. 12A, according to one embodiment.
FIG. 12D is an expanded perspective view of the distal anchor coupled to the elongate body of the insertion device of FIG. 12A, according to one embodiment.
Figure 12F:
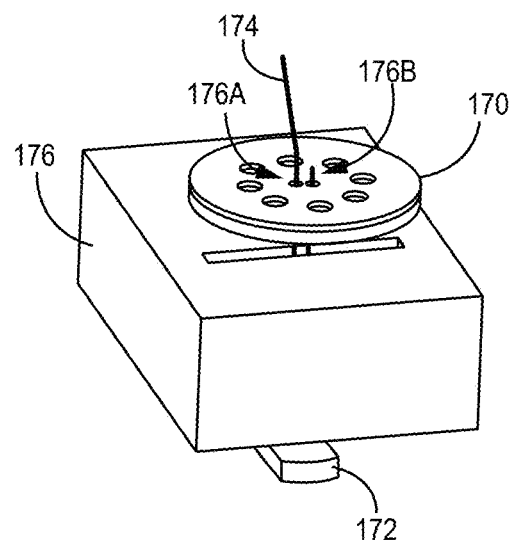

Once the anchor 172 has been inserted into the annulus 176, the insertion device 142 is retracted, thereby leaving the assembly 140 in place, as best shown in FIGS. 12E and 12F. At this point, the proximal end of the tether 174 is tensioned or urged proximally, thereby urging the anchor 172 into contact with the interior wall of the annulus 176 and urging the treatment body 170 toward and into contact with the exterior wall at the target area of the annulus 176.

In certain implementations, any of the insertion devices disclosed or contemplated herein (including devices 90, 120, 142) can also include an advancement tool similar to the tool 60 described above that can be incorporated into the insertion device and used in a fashion similar to that discussed above with respect to FIGS. 5 and 6. Further, any of the insertion method and/or device embodiments herein can be used with any type of treatment device, including the various treatment device embodiments herein along with any known non-integratable treatment devices.

According to various embodiments, all of the insertion devices disclosed or contemplated herein (including devices 90, 120) can also have a curved or bent configuration similar to the insertion device 142 as shown in FIGS. 12A-12D in order to ensure optimized visualization of the treatment site during the procedure. More specifically, any of the insertion devices 90, 120, 142 can have an offset or bayonet configuration, or any other configuration in which the proximal portion and handle of the insertion device is non-coaxial with the distal portion of the device, thereby ensuring optimal visualization for the surgeon.

Certain of the insertion devices described herein—including devices 90, 120, 142—provide more uniformity and control of the treatment device implantation procedures in comparison to known procedures. As such, these devices (and the related methods) are more conducive to implementation of robotic versions thereof than the known procedures.

One embodiment of the treatment body 170 is depicted in further detail in FIGS. 13A-13D. As shown, the body 170 has a support structure 172 disposed within the patch body 174. The patch body 174 in this specific implementation has a base 174A and a cover 174B that can couple with the base 174A. Further, the base 174A has a receptacle 176 defined within the base 174A that is sized to receive the support structure 172 such that the support structure 172 can be positioned within the receptacle 176 and the cover 174B coupled to the base 174A, thereby enclosing the support structure 172 therein. Alternatively, the patch body 174 is a single, unitary body 174 (rather than being made of two coupleable components). In accordance with one embodiment, the support structure 172 has greater rigidity than the patch body 174, thereby providing some additional structure and support to the treatment body 170. In one implementation, the support structure 172 is made of is made of metals such as titanium and the like, bioresorbable materials such as bioresorbable metals (such as iron, magnesium, zinc-based metals, or the like), and or other known bioresorbable materials, polymeric materials such as PEEK, PET, carbon fiber reinforced PEEK, polylactic acid, poly-L-lactic acid, polyglycolic acid, ceramic, and the like, and/or any other materials used for similar implantable structures.

Various additional treatment body or patch embodiments will now be discussed. The various treatment body embodiments disclosed or contemplated throughout the application can be used in combination with any of the methods or insertion assemblies set forth herein. The various treatment assembly implementations herein with a treatment body having an associated support body allows the support body and/or the entire treatment body (with the support body) to serve as a proximal anchor in the treatment assembly.

In one embodiment, the treatment body 200 can have a patch body 202 with a proximal support body 204 attached thereto, as shown in FIGS. 14A and 14B. In the exemplary implementation as shown, the proximal support body 204 is a four pronged support structure 204 such that each prong 204A, 204B, 204C, 204D extends to or near to the outer circumferential edge 206 of the patch 202. Alternatively, the proximal support structure 204 can be any structure 204 of any configuration that provides additional rigidity and/or structural support to the treatment body 200. The proximal support body 204 can be made of metals such as titanium and the like, bioresorbable materials such as bioresorbable metals (such as iron, magnesium, zinc-based metals, or the like), and or other known bioresorbable materials, polymeric materials such as PEEK, PET, carbon fiber reinforced PEEK, polylactic acid, poly-L-lactic acid, polyglycolic acid, ceramic, and the like, and/or any other material used for similar implantable structures. In this implementation, the patch body 202 has a domed shape as shown that is supported by the support structure 204. Alternatively, the treatment body 200 can be substantially flat or any other shape as disclosed or contemplated elsewhere herein.

Another exemplary implementation of a treatment body 210 of varying shapes is depicted in FIGS. 15A-15C. More specifically, the treatment body 210 can have a substantially square shape as shown in FIG. 15A, a substantially rectangular shape as shown in FIG. 15B, or a substantially diamond shape as shown in FIG. 15C. In a further embodiment, the treatment body 210 can have any known shape. In each of these implementations, the body 210 is substantially flat. Further, in these specific embodiments, the treatment body 210 is solely the patch body 210. Alternatively, any support body in any of the other embodiments disclosed or contemplated herein can be used in combination with the patch body 210.

A further embodiment of a treatment body 220 is shown in FIGS. 16A-16F. In this implementation, the treatment body 220 has a support structure 224 disposed within the patch body 226, as best shown in FIGS. 16C, 16D, and 16E. As with other similar treatment body implementations herein, the combination of the support body 224 and patch body 226 results in a treatment body 220 that has sufficient rigidity to serve as a combination treatment body and proximal anchor. The body 220 can move between an insertion or collapsed configuration as shown in FIGS. 16A and 16C and a deployed or expanded configuration as shown in FIGS. 16B and 16D. As such, in certain embodiments, the body 220 in the collapsed configuration can fit within and thus be urged through a delivery device (such as an insertion needle, for example) and then expanded into its deployed configuration once it is urged out of the delivery device and positioned adjacent to or against the target site on the annulus. The support structure 224 has two hubs 228A, 228B that are coupled together via multiple collapsible ribs 230. In this specific embodiment, the structure 224 has eight collapsible ribs 230, but the number of ribs 230 can be two, four, six, 10, 12, or any other number of ribs 230. In one implementation, the support structure 224 is made of metals such as titanium and the like, bioresorbable materials such as bioresorbable metals (such as iron, magnesium, zinc-based metals, or the like), and or other known bioresorbable materials, polymeric materials such as PEEK, PET, carbon fiber reinforced PEEK, polylactic acid, poly-L-lactic acid, polyglycolic acid, ceramic, and the like, and/or any other material used for similar implantable structures.

In certain implementations, the patch body 226 disposed over the support body 224 can be sized (rectangular, oval, etc.) to constrain the expandable support body (or "frame") 224 in order to provide a variable geometry treatment body 220. In certain embodiments, the patch body 226 is disposed over the entire support body 224, including both sides. Alternatively, the patch body 226 can be disposed over one side of the support body 224. Further, the expandable support body 224 can be a tubular braid that forms the planar disc as shown in FIGS. 16B and 16D when both hubs 228A, 228B are compressed axially. Alternatively, the expandable support body 224 can be a section of tubing (metallic or polymer) with axial slits machined in the walls forming struts between unmachined end pieces of a tube that form the hubs 228A, 228B. Upon axial compression, the struts deform perpendicularly from the center of centerline axis forming the frame.

The various treatment devices 50, 72, 170, 200, 210, 220 have a treatment or patch body associated therewith. More specifically, in certain embodiments such as treatment devices 50 and 210, the treatment device 50, 210 is the treatment or patch body 50, 210 such that the patch body 50, 210 is made up of the patch material as described below. Alternatively, in some implementations such as treatment devices 72, 200, and 220, each device 72, 200, 220 has a treatment or patch body 86, 202, 226 and a support body 88, 204, 224, as described in further detail above. Regardless of the specific embodiment, the treatment body 86 in any of the embodiments disclosed or contemplated herein is made of a material that integrates with the native tissue at the target site in the patient. Further, the material is a biologic or synthetic mesh that stimulates tissue infiltration into the mesh, replacement of some portions of the mesh with tissue, and/or remodeling of the native tissue. The material can be, for example, a xenograft, allograft, or autograft. In some implementations, the patch material is a cross-linked collagen material. Further, in some specific embodiments, the patch material is acellular porcine pericardium tissue. According to certain implementations, the pericardium tissue is provided in a wet or dry state. For example, in one embodiment, the patch material is XI-S Lightweight Biologic Mesh, which is commercially available from Colorado Therapeutics. Alternatively, any known material for use in implants that does not fully absorb in water and thus integrates with and spurs additional cellular growth of native tissue can be used.

Further, the patch material can be made of synthetic or biological tissue, or a combination of the two. In addition, in certain specific implementations, the patch material can have some metal incorporated therein as well. The various materials that can be used as the patch material can be biological tissue that minimizes any inflammatory effect associated with such an implant. Further, the patch body and/or the materials therein can have surface enhancements such as holes, roughness, or therapeutic agents such as embedded or coated agents to enhance cell growth. In addition, any patch body or patch material disclosed or contemplated herein can also be used to deliver therapeutic agents for any purpose. As such, any such body or material can contain cells, drugs, natural agents, microencapsulated therapeutic agents, adhesives, or filler agents (such as nucleus pulposus) that can be disposed within the patch prior to delivery and thus can be delivered to the target site via any delivery method such as upon compression of the patch body or upon any other trigger (or over time). In those implementations that include a therapeutic agent, the patch body and/or material can have holes or be porous so the body can be used to deliver the therapeutic agents. Further, any body and/or material can have surface enhancement features and/or embodiment opacifiers to improve imaging. In another implementation, any patch body or material can contain ferromagnetic materials so the patch body can be vibrated using an external magnetic field.

According to certain embodiments, any patch body in any implementation disclosed or contemplated herein can be made of any materials as described in U.S. Pat. Nos. 10,675,381 and/or 10,695,463, both of which are hereby incorporated herein by reference in their entireties.

According to various embodiments, any of the various treatment bodies disclosed or contemplated herein can have at least one or more openings, guides, or other mechanisms or features that can be used to insert or thread the treatment body through or over the pre-applied tethers as described elsewhere herein. Further, as also mentioned elsewhere herein, any of the various treatment body implementations herein having a support body associated therewith can serve as a combination treatment body and proximal anchor.

The various anchors 28, 30, 32, 34, 74, 172 discussed herein, along with any other anchors disclosed or contemplated elsewhere herein, can be made of any known metallic, polymeric, or biological material. For example, in certain embodiments, any anchor herein can be made of metals such as titanium and the like, bioresorbable materials such as bioresorbable metals (such as iron, magnesium, zinc-based metals, or the like), and or other known bioresorbable materials, polymeric materials such as PEEK, PET, carbon fiber reinforced PEEK, polylactic acid, poly-L-lactic acid, polyglycolic acid, ceramic, and the like, and/or any other material used for similar implantable structures. Further, the various anchors 28, 30, 32, 34, 74, 172 can take on any configuration or structure as necessary or beneficial for any of the various assemblies disclosed or contemplated herein. According to various alternative implementations, any anchor herein can have a barb or other similar mechanical mechanism or feature that can be used to embed the anchor within the wall of the target annulus. In other embodiments, any anchor can have an end cap, end plate, or other physical structure incorporated into or attached to the anchor to prevent the anchor from being pushed completely through the annulus wall.

Turning now to the resulting treatment devices as implanted at the target annulus, any of the various insertion methods and/or devices disclosed or contemplated herein can be used to insert any of the treatment assemblies herein in a variety of configurations. Further, according to some embodiments, at least a first anchor of any of the treatment assemblies herein can be deployed using any of the various insertion methods and/or devices, and then additional anchoring assemblies can be implanted as well to further anchor the treatment device. For example, as shown in FIGS. 17A-17D, an exemplary treatment body 250 (which is intended to exemplify any of the treatment bodies disclosed or contemplated herein) can be positioned against and attached to the target annulus 252 using one or more anchoring assemblies such as the exemplary anchoring assembly 254 depicted in FIG. 17B. The assembly 254 has a distal anchor 256, a proximal anchor 258, and a tether 260 attaching the two anchors 256, 258. More specifically, as best shown in FIGS. 17C and 17D, four such anchoring assemblies 254A, 254B, 254C, 254D are used to attach the treatment body 250 to the annulus 252 and adjacent bodies. That is, two of the anchoring assemblies 254A, 254C are anchored into the annulus 252, while two of the anchoring assemblies 254B, 254D are anchored into the adjacent vertebral bodies 262A, 262B as shown.

Cross-sectional side views of exemplary anchoring assemblies are shown in FIGS. 18A and 18B, according to certain implementations. In FIG. 18A, the treatment body 250 is anchored to the annulus 252 via the anchoring assembly 254 such that the distal anchor 256 is disposed against the inner wall of the annulus 252 and the proximal anchor is disposed against the outer surface of the treatment body 250, thereby retaining the body 250 against the outer wall of the annulus 252. Alternatively, in FIG. 18B, the treatment body 250 can be anchored to the annulus 252 via the anchoring assembly 254 such that the distal (or first) anchor 256 is disposed against the inner wall of the annulus 252 and the proximal (or second) anchor 258 is disposed within and attached to the adjacent vertebral body 262.

Further, in certain alternative embodiments, any of the treatment bodies herein can be attached to a target annulus using any of the anchoring assemblies herein that can be attached to the same annulus wall or, alternatively, to the opposite wall of the annulus. More specifically, as best shown in FIG. 19A, in a fashion similar to the treatment bodies in FIGS. 18A and 18B, the treatment body 250 is attached to the annulus wall 252 via two anchoring assemblies 254A, 254B that are anchored into the immediate wall 252 to which the device 250 is attached. As such, the distal anchors 256 of the two assemblies 254A, 254B are disposed against the inner wall of the annulus 252. Alternatively, as shown in FIG. 19B, the treatment body 250 is attached to the annulus wall 252 via two anchoring assemblies 254A, 254B that are anchored into the opposing wall of the annulus 252 such that the tethers 260 of each anchoring assembly 254A, 254B extend across the cavity of annulus 252 as shown. As such, the distal anchors 256 of the two assemblies 254A, 254B are disposed against the outer wall on the opposing side of the annulus 252.

The configuration of the anchoring assemblies in relation to the treatment body, the target annulus, and the adjacent vertebral bodies can vary depending on the condition of the tissues, the defect, and various other factors. As such, a variety of configurations are contemplated.

For example, in FIG. 20A, the treatment body 250 is a substantially square body 250 that is disposed entirely over the annulus 252 and the four anchoring assemblies 254A, 254B, 254C, 254D are attached to the four corners of the body 250 such that the proximal anchors 258 are disposed against the body 250 and the assemblies are anchored into the annulus 252.

Alternatively, as shown in FIG. 20B, the treatment body 250 is a substantially square body 250 that is disposed entirely over the annulus 252 and the four anchoring assemblies 254A, 254B, 254C, 254D are attached to the four corners of the body 250. Two of the anchoring assemblies 254A, 254D are attached such that the proximal anchors 258 are disposed against the body 250 and the assemblies 254A, 254D are anchored into the annulus 252. In contrast, two of the anchoring assemblies 254B, 254C are attached such that the distal anchors (not shown) are disposed against the inner wall of the annulus while the proximal anchors (not shown) are disposed in the adjacent vertebral bodies 262A, 262B in a fashion similar to FIG. 18B.

In a further embodiment as shown in FIG. 20C, the treatment body 250 is a substantially square body 250 with a part of the body 250 disposed over the annulus 252 and a part disposed over the adjacent vertebral body 262A. Further, two of the anchoring assemblies 254A, 254B are attached such that the assemblies 254A, 254B are anchored into the vertebral body 262A, while the other two of the anchoring assemblies 254C, 254D are anchored into the annulus 252.

According to another alternative, as shown in FIG. 20D, the treatment body 250 is a substantially square body 250 with a part of the body 250 disposed over the annulus 252 and a part disposed over the adjacent vertebral body 262A. Two of the anchoring assemblies 254A, 254B are attached such that the proximal anchors 258 are disposed against the body 250 and the assemblies 254A, 254B are anchored into the vertebral body 262A. In contrast, the other two of the anchoring assemblies 254C, 254D are attached such that the distal anchors (not shown) are disposed against the inner wall of the annulus while the proximal anchors (not shown) are disposed in the opposing adjacent vertebral body 262B in a fashion similar to FIG. 18B.

In a further embodiment as shown in FIG. 20E, the treatment body 250 is a substantially rectangular body 250 with a first end of the body 250 disposed over the vertebral body 262A, a second end disposed over the vertebral body 262B, and a portion of the body 250 therebetween disposed over the annulus 252. Two of the anchoring assemblies 254A, 254B are attached such that the assemblies 254A, 254B are anchored into the vertebral body 262A, while the other two of the anchoring assemblies 254C, 254D are anchored into the vertebral body 262B.

FIG. 20F depicts an embodiment in which the treatment body 250 is a substantially rectangular body 250 with a first end of the body 250 disposed over the vertebral body 262A, a second end disposed over the vertebral body 262B, and a portion of the body 250 therebetween disposed over the annulus 252. In this embodiment, there are six anchoring assemblies, with two of the anchoring assemblies 254A, 254B attached such that the assemblies 254A, 254B are anchored into the vertebral body 262A, two of the assemblies 254C, 254D are anchored into the vertebral body 262B, and two of the assemblies 254E, 254F are anchored into the annulus 252 as shown.

FIG. 20G depicts an embodiment in which the treatment body 250 is a substantially diamond-shaped body 250 with a first end of the body 250 disposed over the vertebral body 262A, a second end disposed over the vertebral body 262B, and a portion of the body 250 therebetween disposed over the annulus 252. In this embodiment, one of the anchoring assemblies 254A is attached such that the assembly 254A is anchored into the vertebral body 262A, another of the anchoring assemblies 254B is attached such that the assembly 254B is anchored into the annulus 252, a third assembly 254C is anchored into the vertebral body 262B, and the fourth assembly 254D is anchored into the annulus 252 as shown.

Alternatively, any other configurations of treatment bodies with various anchoring configurations can also be used.

As discussed in detail above, the various methods herein include certain embodiments in which a distal anchor is first implanted or otherwise positioned in the target area and then the treatment device is subsequently implanted. Further, other methods include certain embodiments in which the treatment device is first implanted and then is subsequently anchored. The insertion devices depicted in FIGS. 9-10E and 17-20G and discussed above can be used in either of these method embodiments.

While the various systems described above are separate implementations, any of the individual components, mechanisms, or devices, and related features and functionality, within the various system embodiments described in detail above can be incorporated into any of the other system embodiments herein.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, there is certain inadvertent error and variation in the real world that is likely through differences in the manufacture, source, or precision of the components used to make the various components or carry out the methods and the like. The term "about" also encompasses these variations. The term "about" can include any variation of 5% or 10%, or any amount—including any integer—between 0% and 10%. Further, whether or not modified by the term "about," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Although the various embodiments have been described with reference to preferred implementations, persons skilled in the art will recognize that changes may be made in form and detail without departing from the spirit and scope thereof.

What is claimed is:

1. An annulus repair system comprising:
   (a) an insertion needle comprising a lumen defined therethrough; and
   (b) an annulus treatment assembly comprising:
      (i) an integratable treatment device comprising:
         (A) an integratable patch body; and
         (B) a support structure associated with the integratable patch body;
      (ii) a distal anchor sized to fit within the lumen of the insertion needle;
      (iii) a tether comprising:
         (A) a distal length operably coupled to the treatment device;
         (B) a proximal length operably coupled to the treatment device; and
         (C) a middle length operably coupled to the distal anchor; and
      (iv) a one-way coupling mechanism slidably coupled to the tether, wherein the one-way coupling mechanism is disposed between the integratable treatment device and the distal anchor,
      wherein a portion of the distal length of the tether and a portion of the proximal length of the tether are slidably disposed through the one-way coupling mechanism.

2. The annulus repair system of claim 1, further comprising a pushing device positionable through the lumen of the insertion needle.

3. The annulus repair system of claim 1, wherein the integratable patch body comprises a material configured to integrate into a native tissue.

4. The annulus repair system of claim 3, wherein the material comprises a cross-linked collagen material or porcine pericardium tissue.

5. The annulus repair system of claim 1, wherein the support structure is attached to a proximal side of the integratable patch body.

6. The annulus repair system of claim 1, wherein the support structure comprises a substantially rigid disk.

7. The annulus repair system of claim 1, wherein the support structure is disposed within the integratable treatment device.

8. The annulus repair system of claim 1, wherein the tether comprises a ball structure at a distal end of the tether.

9. A method of repairing a herniated annulus comprising:
   positioning a distal anchor within a lumen of an insertion needle;
   inserting the needle into the annulus such that a distal tip of the needle extends into an interior of the annulus;
   ejecting the distal anchor into the interior of the annulus;
   retracting the insertion needle;
   applying proximal tension to a tether coupled to the distal anchor to ensure securement of the distal anchor against an inner wall of the annulus, wherein a one-way coupling mechanism is slidably coupled to the tether;
   urging a proximal length of the tether proximally through the one-way coupling mechanism such that a distal length of the tether is urged distally through the one-way coupling mechanism such that a treatment device coupled to the distal length of the tether is urged into contact with an outer wall of the annulus; and
   securing the treatment device to the outer wall of the annulus.

10. The method of claim 9, wherein the ejecting the distal anchor further comprises urging a pushing device distally through the lumen, whereby the distal anchor is ejected.

11. The method of claim 9, further comprising positioning the treatment device such that the treatment device is not disposed within the lumen prior to the inserting the needle into the annulus.

12. The method of claim 9, wherein the treatment device is disposed outside of the annulus when the distal tip of the needle extends into the interior of the annulus.

13. The method of claim 9, wherein the tether is disposed through at least one opening defined in the distal anchor such that the tether is coupled to the distal anchor.

14. An annulus repair system comprising:
   (a) an insertion needle comprising a lumen defined therethrough;
   (b) an annulus treatment assembly comprising:
      (i) an integratable treatment device;
      (ii) a distal anchor sized to fit within the lumen of the insertion needle;
      (iii) a tether comprising:
         (A) a distal length slidably coupled to the treatment device;
         (B) a proximal length slidably coupled to the treatment device; and
         (C) a middle length slidably coupled to the distal anchor; and
      (iv) a one-way coupling mechanism slidably coupled to the tether, wherein the one-way coupling mechanism is disposed between the integratable treatment device and the distal anchor,
      wherein a portion of the distal length of the tether and a portion of the proximal length of the tether are slidably disposed through the one-way coupling mechanism.

15. The annulus repair system of claim 14, wherein the integratable treatment device comprises:
   (a) an integratable patch body comprising a material configured to integrate into a native tissue; and
   (b) a support structure associated with the integratable patch body.

16. The annulus repair system of claim 15, wherein the support structure is disposed within the integratable treatment device.

17. The annulus repair system of claim 15, wherein the material comprises a cross-linked collagen material or porcine pericardium tissue.

18. The annulus repair system of claim 15, wherein the support structure is attached to a proximal side of the integratable patch body.

19. The annulus repair system of claim 14, further comprising a pushing device positionable through the lumen of the insertion needle.

20. The annulus repair system of claim 14, wherein the tether comprises a ball structure at a distal end of the tether.

* * * * *